United States Patent
Xu

(10) Patent No.: US 10,476,691 B2
(45) Date of Patent: Nov. 12, 2019

(54) MULTICAST FORWARDING METHOD AND APPARATUS

(71) Applicant: Huawei Technologies Co., Ltd., Shenzhen (CN)

(72) Inventor: Xiaohu Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 15/655,568

(22) Filed: Jul. 20, 2017

(65) Prior Publication Data

US 2017/0317841 A1 Nov. 2, 2017

Related U.S. Application Data

(63) Continuation of application No. PCT/CN2016/070586, filed on Jan. 11, 2016.

(30) Foreign Application Priority Data

Jan. 20, 2015 (CN) .......................... 2015 1 0029231

(51) Int. Cl.
*H04L 12/18* (2006.01)
*H04L 12/741* (2013.01)
(Continued)

(52) U.S. Cl.
CPC ............ *H04L 12/185* (2013.01); *H04L 12/18* (2013.01); *H04L 12/1886* (2013.01);
(Continued)

(58) Field of Classification Search
CPC ... H04L 12/185; H04L 12/18; H04L 12/1886; H04L 12/4641; H04L 45/745; H04L 45/16

See application file for complete search history.

(56) References Cited

U.S. PATENT DOCUMENTS

2003/0185209 A1 10/2003 Lee
2015/0078377 A1* 3/2015 Wijnands ............ H04L 12/1886
370/390
(Continued)

FOREIGN PATENT DOCUMENTS

CN 1905530 A 1/2007
CN 101232392 A 7/2008
(Continued)

OTHER PUBLICATIONS

Aggarwal, R., et al.,"BGP Encodings and Procedures for Multicast in MPLS/BGP IP VPNs," RFC6514, XP015081440, Feb. 2012, 59 pages.
(Continued)

*Primary Examiner* — Habte Mered
(74) *Attorney, Agent, or Firm* — Conley Rose, P.C.

(57) ABSTRACT

A multicast forwarding method and an apparatus, where a bit-forwarding egress router (BFER) in a bit index explicit replication (BIER) network may determine, according to information about a multicast group in a multicast receiver list obtained in advance, an Internet Protocol (IP) address of a registration router that supports the multicast group, the BFER generates a BFER registration message according to the information about the multicast group and the IP address of the registration router that supports the multicast group, where the BFER registration message includes the information about the multicast group, a destination IP address of the BFER registration message is the IP address of the registration router, and a source IP address of the BFER registration message is an IP address of the BFER, and the BFER sends the BFER registration message to the registration router.

14 Claims, 10 Drawing Sheets

```
                                                    ┌─ 201
┌─────────────────────────────────────────────────────────┐
│  A registration router receives a BFER registration     │
│  message sent by a BFER, where the BFER registration    │
│  message includes information about a multicast group,  │
│  a destination IP address of the BFER registration      │
│  message is an IP address of the registration router,   │
│  and a source IP address of the BFER registration       │
│  message is an IP address of the BFER                   │
└─────────────────────────────────────────────────────────┘
                            │
                            ▼   ┌─ 202
┌─────────────────────────────────────────────────────────┐
│  The registration router obtains a BFER entry           │
│  according to the BFER registration message, where      │
│  the BFER entry includes the information about the      │
│  multicast group and the IP address of the BFER, and    │
│  the IP address of the BFER corresponds to the          │
│  information about the multicast group                  │
└─────────────────────────────────────────────────────────┘
```

(51) Int. Cl.
*H04L 12/46* (2006.01)
*H04L 12/761* (2013.01)

(52) U.S. Cl.
CPC ........ *H04L 45/745* (2013.01); *H04L 12/4641* (2013.01); *H04L 45/16* (2013.01)

(56) References Cited

U.S. PATENT DOCUMENTS

| | | | | |
|---|---|---|---|---|
| 2015/0078379 | A1* | 3/2015 | Wijnands | H04L 12/1886 370/390 |
| 2015/0078380 | A1* | 3/2015 | Wijnands | H04L 12/1886 370/390 |
| 2015/0131658 | A1* | 5/2015 | Wijnands | H04L 45/16 370/390 |
| 2015/0131659 | A1 | 5/2015 | Wijnands et al. | |
| 2015/0139228 | A1* | 5/2015 | Wijnands | H04L 12/185 370/390 |
| 2015/0341183 | A1 | 11/2015 | Song et al. | |
| 2016/0087890 | A1* | 3/2016 | Przygienda | H04L 45/16 370/255 |
| 2016/0119159 | A1* | 4/2016 | Zhao | H04L 12/1854 370/390 |
| 2016/0134535 | A1* | 5/2016 | Callon | H04L 45/48 370/390 |

FOREIGN PATENT DOCUMENTS

| | | |
|---|---|---|
| CN | 101394342 A | 3/2009 |
| CN | 101605103 A | 12/2009 |
| CN | 102571375 A | 7/2012 |
| CN | 103873373 A | 6/2014 |

OTHER PUBLICATIONS

Rosen, E, et al.,"Multicast in MPLS/BGP IP VPNs," XP015081439, RFC6513, Feb. 2012, 88 pages.
Wijnands, IJ., Ed., et al.,"Multicast using Bit Index Explicit Replication," XP015103440, draft-wijnands-bier-architecture-02, Dec. 4, 2014, 27 pages.
Foreign Communication From a Counterpart Application, European Application No. 16739734.8, Extended European Search Report dated Feb. 8, 2018, 16 pages.
Machine Translation and Abstract of Chinese Publication No. CN101232392, Jul. 30, 2008, 6 pages.
Machine Translation and Abstract of Chinese Publication No. CN101394342, Mar. 25, 2009, 13 pages.
Machine Translation and Abstract of Chinese Publication No. CN101605103, Dec. 16, 2009, 16 pages.
Wijnands, IJ., Ed., et al., "Multicast using Bit Index Explicit Replication," draft-wijnands-bier-architecture-01, Oct. 16, 2014, 24 pages.
Fenner, B., et al., "Protocol Independent Multicast—Sparse Mode (PIM-SM): Protocol Specification (Revised)," RFC 4601, Aug. 2006, 112 pages.
Lindem, A., Ed., et al., "Extensions to OSPF for Advertising Optional Router Capabilities," RFC 4970, Jul. 2007, 13 pages.
Vasseur, JP., Ed., et al., "Intermediate System to Intermediate System (IS-IS) Extensions for Advertising Router Information," RFC 4971, Jul. 2007, 9 pages.
Foreign Communication From a Counterpart Application, PCT Application No. PCT/CN2016/070586, English Translation of International Search Report dated Mar. 24, 2016, 2 pages.
Foreign Communication From a Counterpart Application, PCT Application No. PCT/CN2016/070586, English Translation of Written Opinion dated Mar. 24, 2016, 5 pages.
Machine Translation and Abstract of Chinese Publication No. CN1905530, Jan. 31, 2007, 35 pages.
Machine Translation and Abstract of Chinese Publication No. CN102571375, Jul. 11, 2012, 12 pages.
Foreign Communication From a Counterpart Application, Chinese Application No. 201510029231.X, Chinese Office Action dated Apr. 21, 2019, 4 pages.
Foreign Communication From a Counterpart Application, Chinese Application No. 201510029231.X, Chinese Search Report dated Apr. 3, 2019, 2 pages.

* cited by examiner

MULTICAST FORWARDING METHOD AND APPARATUS

CROSS-REFERENCE TO RELATED APPLICATIONS

This application is a continuation of International Patent Application No. PCT/CN2016/070586 filed on Jan. 11, 2016, which claims priority to Chinese Patent Application No. 201510029231.X filed on Jan. 20, 2015. The disclosures of the aforementioned applications are hereby incorporated by reference in their entireties.

TECHNICAL FIELD

The present disclosure relates to communications technologies, and in particular, to a multicast forwarding method, a bit-forwarding egress router (BFER), a bit-forwarding ingress router (BFIR), and a registration router.

BACKGROUND

A bit index explicit replication (BIER) technology is a novel packet transmission technology. In the BIER technology, a packet may be transmitted using multiple bit-forwarding routers (BFR) disposed in a BIER network.

Both a BFIR and a BFER are BFRs in the BIER network. The BFIR may send a packet to the BFER in the BIER network. The BFIR may obtain a bit string according to a bit corresponding to the BFER, and the bit, in the bit string, corresponding to the BFER is set. The BFIR may add the bit string to the packet to obtain a BIER packet. In this way, a BFR that receives the BIER packet may forward the BIER packet to the BFER according to the bit that is set in the bit string.

A method for forwarding a multicast packet is not provided in the existing BIER technology.

SUMMARY

In view of this, embodiments of the present disclosure provide a multicast forwarding method and an apparatus in order to help a BFIR obtain information about a BFER included in a multicast group and help implement rapid deployment of a BIER multicast network.

Technical solutions provided in the embodiments of the present disclosure are as follows.

According to a first aspect, a multicast forwarding method is provided, applied to a BIER network, including determining, by a BFER according to information that is about a multicast group in a multicast receiver list and that is obtained in advance, an Internet Protocol (IP) address of a registration router that supports the multicast group, where the registration router has a capability of processing a multicast registration message, generating, by the BFER, a BFER registration message according to the information about the multicast group and the IP address of the registration router, where the BFER registration message is included in the multicast registration message, the BFER registration message includes the information about the multicast group, a destination IP address of the BFER registration message is the IP address of the registration router, and a source IP address of the BFER registration message is an IP address of the BFER, and sending, by the BFER, the BFER registration message to the registration router.

In a first possible implementation manner of the foregoing first aspect, the method further includes obtaining, by the BFER, information about at least one registration router by means of static configuration or by receiving an advertisement packet, where the information about the at least one registration router includes an IP address of the at least one registration router and information about a multicast group supported by the at least one registration router, the advertisement packet is used to advertise that the at least one registration router has a capability of processing the multicast registration message, and the advertisement packet includes the information about the at least one registration router.

With reference to the foregoing first possible implementation manner of the first aspect, in a second possible implementation manner of the first aspect, determining, by a BFER according to information that is about a multicast group in a multicast receiver list and that is obtained in advance, an IP address of a registration router that supports the multicast group includes determining, by the BFER according to the information about the multicast group in the multicast receiver list and the information about the multicast group supported by the at least one registration router, the IP address of the registration router that supports the multicast group in the multicast receiver list.

With reference to the foregoing first aspect, the foregoing first possible implementation manner of the first aspect, or the foregoing second possible implementation manner of the first aspect, in a third possible implementation manner of the first aspect, the BFER registration message is a Protocol Independent Multicast (PIM) join message, a Border Gateway Protocol (BGP) update message, or a Locator Identity Separation Protocol (LISP) map-register message.

With reference to the foregoing first aspect, the foregoing first possible implementation manner of the first aspect, the foregoing second possible implementation manner of the first aspect, or the third possible implementation manner of the first aspect, in a fourth possible implementation manner of the first aspect, the method further includes obtaining, by the BFER, a BFER deregistration message after an entry included in the multicast receiver list is deleted, where the deleted entry includes information about a multicast group, and the BFER deregistration message includes the information about the multicast group in the deleted entry and the IP address of the BFER, and sending, by the BFER, the BFER deregistration message to the registration router.

According to a second aspect, a multicast forwarding method is provided, applied to a BIER network, including receiving, by a registration router, a BFER registration message sent by a BFER, where the registration router has a capability of processing a multicast registration message, the multicast registration message includes the BFER registration message, the BFER registration message includes information about a multicast group, a destination IP address of the BFER registration message is an IP address of the registration router, and a source IP address of the BFER registration message is an IP address of the BFER, and obtaining, by the registration router, a BFER entry according to the BFER registration message, where the BFER entry includes the information about the multicast group and the IP address of the BFER, and the IP address of the BFER corresponds to the information about the multicast group.

In a first possible implementation manner of the second aspect, the method further includes receiving, by the registration router, a multicast packet sent by a router connected to a multicast source, where the multicast packet includes the information about the multicast group, determining, by the registration router, the BFER entry according to the information about the multicast group included in the multicast packet, obtaining, by the registration router, the IP address of the BFER according to the BFER entry, obtaining, by the registration router, a BIER multicast packet according to the IP address of the BFER and the multicast packet, where the BIER multicast packet includes a BIER header and the multicast packet, the BIER header includes a bit string, and a bit, in the bit string, corresponding to the BFER is set, and sending, by the registration router, the BIER multicast packet to the BFER.

With reference to the foregoing second aspect, in a second possible implementation manner of the second aspect, the method further includes obtaining, by the registration router from a router connected to a multicast source, the information about the multicast group and an IP address of the router connected to the multicast source, determining, by the registration router according to the information about the multicast group, the BFER entry corresponding to the multicast group, obtaining, by the registration router, a BFER list message according to the BFER entry corresponding to the multicast group and the IP address of the router connected to the multicast source, where the BFER list message includes the IP address of the BFER corresponding to the multicast group, and a destination IP address of the BFER list message is the IP address of the router connected to the multicast source, and sending, by the registration router, the BFER list message to the router connected to the multicast source.

With reference to the foregoing second possible implementation manner of the second aspect, in a third possible implementation manner of the second aspect, obtaining, by the registration router from a router connected to a multicast source, the information about the multicast group and an IP address of the router connected to the multicast source includes receiving, by the registration router, an encapsulated packet that is sent through a tunnel by the router connected to the multicast source, where the encapsulated packet includes a packet header and a multicast packet that is sent by the multicast source to the router connected to the multicast source, a source IP address of the tunnel in the packet header is the IP address of the router connected to the multicast source, and the multicast packet includes the information about the multicast group, and obtaining, by the registration router from the multicast packet, the information about the multicast group, and obtaining, from the packet header, the IP address of the router connected to the multicast source.

With reference to the foregoing second possible implementation manner of the second aspect, in a fourth possible implementation manner of the second aspect, obtaining, by the registration router from a router connected to a multicast source, the information about the multicast group and an IP address of the router connected to the multicast source includes receiving, by the registration router, a multicast source registration message sent by the router connected to the multicast source, where the multicast source registration message includes the information about the multicast group and the IP address of the router connected to the multicast source, and obtaining, by the registration router from the multicast source registration message, the information about the multicast group and the IP address of the router connected to the multicast source.

With reference to the foregoing second aspect, the first possible implementation manner of the second aspect, the second possible implementation manner of the second aspect, or the third possible implementation manner of the second aspect, in a fifth possible implementation manner of the second aspect, the method further includes sending, by the registration router, an advertisement packet in the BIER network, where the advertisement packet is used to advertise that the registration router has a capability of processing the multicast registration message, and the advertisement packet includes the IP address of the registration router and the information about the multicast group.

With reference to the foregoing fourth possible implementation manner of the second aspect, in a sixth possible implementation manner of the second aspect, the method further includes sending, by the registration router, an advertisement packet in the BIER network, where the advertisement packet is used to advertise that the registration router has a capability of processing the multicast registration message, the multicast registration message further includes the multicast source registration message, and the advertisement packet includes the IP address of the registration router and the information about the multicast group.

With reference to the foregoing fifth possible implementation manner of the second aspect or the sixth possible implementation manner of the second aspect, in a seventh possible implementation manner of the second aspect, the advertisement packet is an Open Shortest Path First (OSPF) router information opaque link-state advertisement (LSA), the OSPF router information opaque LSA includes a type-length-value (TLV), and the TLV is used to carry the information about the multicast group and an identifier indicating that the registration router has the capability of processing the multicast registration message.

With reference to the foregoing fifth possible implementation manner of the second aspect or the sixth possible implementation manner of the second aspect, in an eighth possible implementation manner of the second aspect, the advertisement packet is a packet including an Intermediate System to Intermediate System (IS-IS) router capability TLV, the IS-IS router capability TLV includes a sub-TLV, and the sub-TLV is used to carry the information about the multicast group and an identifier indicating that the registration router has the capability of processing the multicast registration message.

With reference to any one of the foregoing second aspect or possible implementation manners of the second aspect, in a ninth possible implementation manner of the second aspect, the method further includes receiving, by the registration router, a BFER deregistration message sent by the BFER, where the BFER deregistration message includes the IP address of the BFER and information about a deleted multicast group, determining, by the registration router, a to-be-deleted BFER entry according to the information about the multicast group and the IP address of the BFER, where the to-be-deleted BFER entry includes the IP address of the BFER and the information about the deleted multicast group, and deleting, by the registration router, the to-be-deleted BFER entry.

According to a third aspect, a multicast forwarding method is provided, applied to a BIER network, including receiving, by a BFIR, a multicast packet from a multicast source, where the multicast packet includes information about a multicast group, and the BFIR is connected to the multicast source, obtaining, by the BFIR from a registration router, an IP address of a BFER corresponding to the multicast group, where the registration router has a capability of processing a multicast registration message, obtaining, by the BFIR, a BIER multicast packet according to the multicast packet and the IP address of the BFER, where the BIER multicast packet includes a BIER header and the multicast packet, the BIER header includes a bit string, and a bit, in the bit string, corresponding to the BFER is set, and sending, by the BFIR, the BIER multicast packet to the BFER.

In a first possible implementation manner of the foregoing third aspect, the method further includes obtaining, by the BFIR, information about at least one registration router by means of static configuration or by receiving an advertisement packet, where the advertisement packet is used to advertise that the at least one registration router has a capability of processing the multicast registration message, the advertisement packet includes the information about the at least one registration router, and the information about the at least one registration router includes an IP address of the at least one registration router and information about a multicast group supported by the at least one registration router.

In the foregoing third aspect or the first possible implementation manner of the third aspect, in a second possible implementation manner of the third aspect, the obtaining, by the BFIR from a registration router, an IP address of a BFER corresponding to the multicast group includes sending, by the BFIR, a multicast source registration message to the registration router according to an IP address of the registration router, where the multicast source registration message includes the information about the multicast group and an IP address of the BFIR, and the multicast registration message includes the multicast source registration message, receiving, by the BFIR, a BFER list message sent by the registration router, where the BFER list message includes the IP address of the BFER, a destination IP address of the BFER list message is the IP address of the BFIR, and a source IP address of the BFER list message is the IP address of the registration router, and obtaining, by the BFIR, the IP address of the BFER from the BFER list message.

According to a fourth aspect, a BFER is provided, where the BFER is located in a BIER network, and the BFER includes a determining unit configured to determine, according to information that is about a multicast group in a multicast receiver list and that is obtained in advance, an IP address of a registration router that supports the multicast group, where the registration router has a capability of processing a multicast registration message, a generation unit configured to generate a BFER registration message according to the information about the multicast group and the IP address of the registration router, where the BFER registration message is included in the multicast registration message, the BFER registration message includes the information about the multicast group, a destination IP address of the BFER registration message is the IP address of the registration router, and a source IP address of the BFER registration message is an IP address of the BFER, and a first sending unit configured to send the BFER registration message to the registration router.

In a first possible implementation manner of the fourth aspect, the BFER further includes a first obtaining unit configured to obtain information about at least one registration router by means of static configuration or by receiving an advertisement packet, where the information about the at least one registration router includes an IP address of the at least one registration router and information about a multicast group supported by the at least one registration router, the advertisement packet is used to advertise that the at least one registration router has a capability of processing the multicast registration message, and the advertisement packet includes the information about the at least one registration router.

With reference to the foregoing first possible implementation manner of the fourth aspect, in a second possible implementation manner of the fourth aspect, the determining unit is further configured to determine, according to the information about the multicast group in the multicast receiver list and the information about the multicast group supported by the at least one registration router, the IP address of the registration router that supports the multicast group in the multicast receiver list.

With reference to the foregoing fourth aspect, the first possible implementation manner of the fourth aspect, or the second possible implementation manner of the fourth aspect, in a third possible implementation manner of the fourth aspect, the BFER registration message is a PIM join message, a BGP update message, or a LISP map-register message.

With reference to the foregoing fourth aspect, the first possible implementation manner of the fourth aspect, the second possible implementation manner of the fourth aspect, or the third possible implementation manner of the fourth aspect, in a fourth possible implementation manner of the fourth aspect, the BFER further includes a second obtaining unit configured to obtain a BFER deregistration message after an entry included in the multicast receiver list is deleted, where the deleted entry includes information about a multicast group, and the BFER deregistration message includes the information about the multicast group in the deleted entry and the IP address of the BFER, and a second sending unit configured to send the BFER deregistration message to the registration router.

According to a fifth aspect, a registration router is provided, where the registration router is located in a BIER network, the registration router has a capability of processing a multicast registration message, and the registration router includes a first receiving unit configured to receive a BFER registration message sent by a BFER, where the registration router has a capability of processing the multicast registration message, the multicast registration message includes the BFER registration message, the BFER registration message includes information about a multicast group, a destination IP address of the BFER registration message is an IP address of the registration router, and a source IP address of the BFER registration message is an IP address of the BFER, and a first obtaining unit configured to obtain a BFER entry according to the BFER registration message, where the BFER entry includes the information about the multicast group and the IP address of the BFER, and the IP address of the BFER corresponds to the information about the multicast group.

In a first possible implementation manner of the fifth aspect, the registration router further includes a second receiving unit configured to receive a multicast packet sent by a router connected to a multicast source, where the multicast packet includes the information about the multicast group, a first determining unit configured to determine the BFER entry according to the information about the multicast group included in the multicast packet, a second obtaining unit configured to obtain the IP address of the BFER according to the BFER entry, a third obtaining unit configured to obtain a BIER multicast packet according to the IP address of the BFER and the multicast packet, where the BIER multicast packet includes a BIER header and the multicast packet, the BIER header includes a bit string, and a bit, in the bit string, corresponding to the BFER is set, and a first sending unit configured to send the BIER multicast packet to the BFER.

With reference to the foregoing fifth aspect, in a second possible implementation manner of the fifth aspect, the registration router further includes a fourth obtaining unit configured to obtain, from a router connected to a multicast source, the information about the multicast group and an IP address of the router connected to the multicast source, a second determining unit configured to determine, according to the information about the multicast group, the BFER entry corresponding to the multicast group, a fifth obtaining unit configured to obtain a BFER list message according to the BFER entry corresponding to the multicast group and the IP address of the router connected to the multicast source, where the BFER list message includes the IP address of the BFER corresponding to the multicast group, and a destination IP address of the BFER list message is the IP address of the router connected to the multicast source, and a second sending unit configured to send the BFER list message to the router connected to the multicast source.

With reference to the foregoing second possible implementation manner of the fifth aspect, in a third possible implementation manner of the fifth aspect, the registration router further includes a third receiving unit configured to receive an encapsulated packet that is sent through a tunnel by the router connected to the multicast source, where the encapsulated packet includes a packet header and a multicast packet that is sent by the multicast source to the router connected to the multicast source, a source IP address of the tunnel in the packet header is the IP address of the router connected to the multicast source, and the multicast packet includes the information about the multicast group, where the fourth obtaining unit is further configured to obtain, from the multicast packet, the information about the multicast group, and obtain, from the packet header, the IP address of the router connected to the multicast source.

With reference to the foregoing second possible implementation manner of the fifth aspect, in a fourth possible implementation manner of the fifth aspect, the registration router further includes a fourth receiving unit configured to receive a multicast source registration message sent by the router connected to the multicast source, where the multicast source registration message includes the information about the multicast group and the IP address of the router connected to the multicast source, where the fourth obtaining unit is further configured to obtain, from the multicast source registration message, the information about the multicast group and the IP address of the router connected to the multicast source.

With reference to the foregoing fifth aspect, the first possible implementation manner of the fifth aspect, the second possible implementation manner of the fifth aspect, or the third possible implementation manner of the fifth aspect, in a fifth possible implementation manner of the fifth aspect, the registration router further includes a third sending unit configured to send an advertisement packet in the BIER network, where the advertisement packet is used to advertise that the registration router has a capability of processing the multicast registration message, and the advertisement packet includes the IP address of the registration router and the information about the multicast group.

With reference to the foregoing fourth possible implementation manner of the fifth aspect, in a sixth possible implementation manner of the fifth aspect, the registration router further includes a third sending unit configured to send an advertisement packet in the BIER network, where the advertisement packet is used to advertise that the registration router has a capability of processing the multicast registration message, the multicast registration message further includes the multicast source registration message, and the advertisement packet includes the IP address of the registration router and the information about the multicast group.

With reference to the foregoing fifth possible implementation manner of the fifth aspect or the sixth possible implementation manner of the fifth aspect, in a seventh possible implementation manner of the fifth aspect, the advertisement packet is an OSPF router information opaque LSA, the OSPF router information opaque LSA includes a TLV, and the TLV is used to carry the information about the multicast group and an identifier indicating that the registration router has the capability of processing the multicast registration message.

With reference to the foregoing fifth possible implementation manner of the fifth aspect or the sixth possible implementation manner of the fifth aspect, in an eighth possible implementation manner of the fifth aspect, the advertisement packet is a packet including an IS-IS router capability TLV, the IS-IS router capability TLV includes a sub-TLV, and the sub-TLV is used to carry the information about the multicast group and an identifier indicating that the registration router has the capability of processing the multicast registration message.

With reference to any one of the foregoing fifth aspect or possible implementation manners of the fifth aspect, in a ninth possible implementation manner of a fifth aspect, the registration router further includes a fifth receiving unit configured to receive a BFER deregistration message sent by the BFER, where the BFER deregistration message includes the IP address of the BFER and information about a deleted multicast group, a third determining unit configured to determine a to-be-deleted BFER entry according to the information about the multicast group and the IP address of the BFER, where the to-be-deleted BFER entry includes the IP address of the BFER and the information about the deleted multicast group, and a deletion unit configured to delete the to-be-deleted BFER entry determined by the third determining unit.

According to a sixth aspect, a BFIR is provided, where the BFIR is located in a BIER network, and the BFIR includes a first receiving unit configured to receive a multicast packet from a multicast source, where the multicast packet includes information about a multicast group, and the BFIR is connected to the multicast source, a first obtaining unit configured to obtain, from a registration router, an IP address of a BFER corresponding to the multicast group, where the registration router has a capability of processing a multicast registration message, a second obtaining unit configured to obtain a BIER multicast packet according to the multicast packet and the IP address of the BFER, where the BIER multicast packet includes a BIER header and the multicast packet, the BIER header includes a bit string, and a bit, in the bit string, corresponding to the BFER is set, and a first sending unit configured to send the BIER multicast packet to the BFER.

In a first possible implementation manner of the sixth aspect, the BFIR further includes a third obtaining unit configured to obtain information about at least one registration router by means of static configuration or by receiving an advertisement packet, where the advertisement packet is used to advertise that the at least one registration router has a capability of processing the multicast registration message, the advertisement packet includes the information about the at least one registration router, and the information about the at least one registration router includes an IP address of the at least one registration router and information about a multicast group supported by the at least one registration router.

With reference to the foregoing sixth aspect or the first possible implementation manner of the sixth aspect, in a second possible implementation manner of the sixth aspect, the BFIR further includes a second sending unit configured to send a multicast source registration message to the registration router according to an IP address of the registration router, where the multicast source registration message includes the information about the multicast group and an IP address of the BFIR, and the multicast registration message includes the multicast source registration message, and a second receiving unit configured to receive a BFER list message sent by the registration router, where the BFER list message includes the IP address of the BFER, a destination IP address of the BFER list message is the IP address of the BFIR, and a source IP address of the BFER list message is the IP address of the registration router, where the first obtaining unit is further configured to obtain the IP address of the BFER from the BFER list message.

According to a seventh aspect, a multicast forwarding method is provided, applied to a BIER network, including receiving, by a router connected to a multicast source, a multicast packet from the multicast source, where the multicast packet includes information about a multicast group, and sending, by the router connected to the multicast source, the multicast packet to a registration router, where the multicast packet includes the information about the multicast group, the registration router has a capability of processing a multicast registration message, the multicast registration message includes a BFER registration message, the BFER registration message includes the information about the multicast group and an IP address of a BFER, and the BFER corresponds to the multicast group.

According to an eighth aspect, a multicast forwarding method is provided, applied to a BIER network, including receiving, by a router connected to a multicast source, a multicast packet from the multicast source, where the multicast packet includes information about a multicast group, and sending, by the router connected to the multicast source, a multicast source registration message to a registration router, where the multicast source registration message includes the information about the multicast group and an IP address of the router connected to the multicast source, the registration router has a capability of processing a multicast registration message, the multicast registration message includes a BFER registration message and the multicast source registration message, the BFER registration message includes the information about the multicast group and an IP address of a BFER, and the BFER corresponds to the multicast group.

According to a ninth aspect, a router is provided, where the router is located in a BIER network, the router is connected to a multicast source, and the router includes a receiving unit configured to receive a multicast packet from the multicast source, where the multicast packet includes information about a multicast group, and a sending unit configured to send the multicast packet to a registration router, where the multicast packet includes the information about the multicast group, the registration router has a capability of processing a multicast registration message, the multicast registration message includes a BFER registration message, the BFER registration message includes the information about the multicast group and an IP address of a BFER, and the BFER corresponds to the multicast group.

According to a tenth aspect, a router is provided, where the router is located in a BIER network, the router is connected to a multicast source, and the router includes a receiving unit configured to receive a multicast packet from the multicast source, where the multicast packet includes information about a multicast group, and a sending unit configured to send a multicast source registration message to a registration router, where the multicast source registration message includes the information about the multicast group and an IP address of the router connected to the multicast source, the registration router has a capability of processing a multicast registration message, the multicast registration message includes a BFER registration message and the multicast source registration message, the BFER registration message includes the information about the multicast group and an IP address of a BFER, and the BFER corresponds to the multicast group.

According to the foregoing solutions, in a multicast forwarding method and an apparatus that are provided in the embodiments of the present disclosure, according to information about a multicast group in a multicast receiver list and obtained information about a multicast group supported by at least one registration router, a BFER may determine a registration router corresponding to the multicast group and generate a BFER registration message. The BFER registration message includes the information about the multicast group and an IP address of the BFER. The BFER may send the BFER registration message to the registration router. The registration router may obtain a BFER entry according to the received BFER registration message sent by the BFER. The BFER entry includes the IP address of the BFER and the information about the multicast group. Using the method and the apparatus that are provided in the embodiments of the present disclosure, the BFER entry obtained by the registration router helps a BFIR obtain the IP address of the BFER, and the BFIR may obtain a BIER multicast packet according to the IP address of the BFER and send the BIER multicast packet to the BFER. Therefore, a BIER technology can be rapidly deployed in a conventional multicast network, and interconnection and intercommunication are implemented between a BIER network and the conventional multicast network.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill may still derive other drawings from these accompanying drawings.

DESCRIPTION OF EMBODIMENTS

Figure 1A:
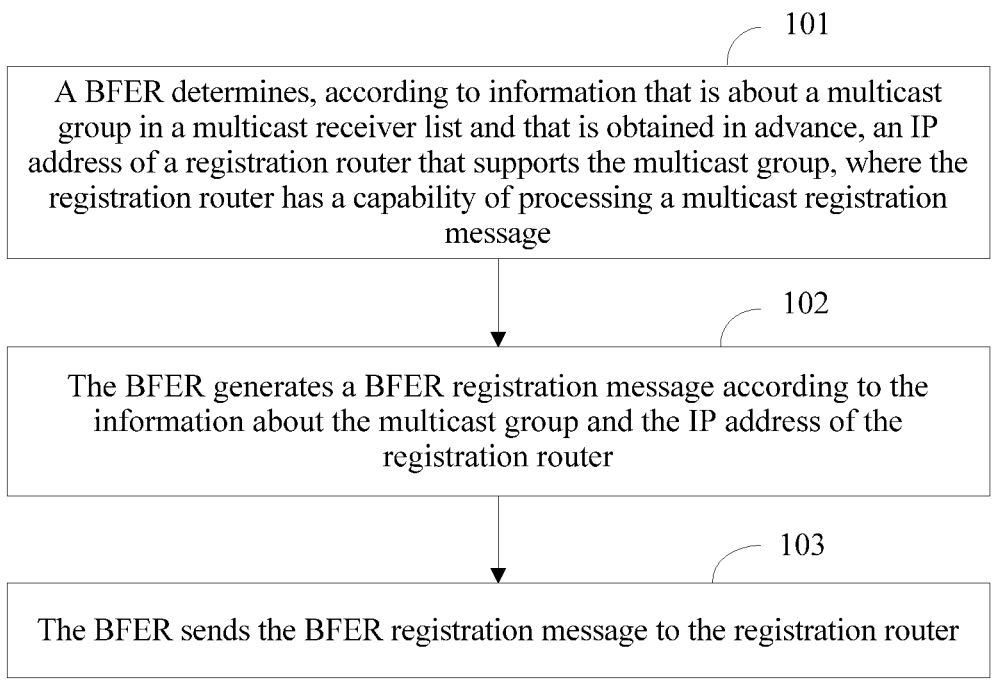
FIG. 1A is a flowchart of a multicast forwarding method according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some rather than all of the embodiments of the present disclosure. All other embodiments obtained by persons of ordinary skill in the art based on the embodiments of the present disclosure shall fall within the protection scope of the present disclosure.

The embodiments of the present disclosure provide a multicast forwarding method. In the method, a BFER in a BIER network may determine, according to information that is about a multicast group in a multicast receiver list and that is obtained in advance, an IP address of a registration router that supports the multicast group, where the registration router has a capability of processing a multicast registration message. The BFER generates a BFER registration message according to the information about the multicast group and the IP address of the registration router that supports the multicast group, where the registration router has a capability of processing the multicast registration message, the multicast registration message includes the BFER registration message, the BFER registration message includes the information about the multicast group, a destination IP address of the BFER registration message is the IP address of the registration router, and a source IP address of the BFER registration message is an IP address of the BFER, and the BFER sends the BFER registration message to the registration router. After receiving the BFER registration message sent by the BFER, the registration router in the BIER network may obtain a BFER entry according to the BFER registration message, where the BFER entry includes the information about the multicast group and the IP address of the BFER, and the IP address of the BFER corresponds to the information about the multicast group.

In the method and the apparatus that are provided in the embodiments of the present disclosure, if the registration router may be used as a BFIR, the registration router may generate a BIER multicast packet according to one or more obtained BFER entries and a received multicast packet, and the registration router used as a BFIR may send the BIER multicast packet in the BIER network. If a router used as a BFIR is not the registration router, the router used as a BFIR may request the IP address of the BFER from the registration router, the router used as a BFIR may generate a BIER multicast packet according to the IP address of the BFER and a received multicast packet, and the router used as a BFIR may send the BIER multicast packet in the BIER network.

In the embodiments of the present disclosure, the BFER may be a router connected to a multicast receiver. The BFIR is a router that generates a BIER multicast packet. The BFIR may be a registration router having a capability of processing a multicast registration message, or a router directly connected to a multicast source. A bit in the embodiments of the present disclosure may be further referred to as a bit or a bit, and examples are not separately provided for description in the embodiments of the present disclosure.

FIG. 1A is a flowchart of a multicast forwarding method according to an embodiment of the present disclosure. The multicast forwarding method in the embodiment corresponding to FIG. 1A is described from the perspective of a BFER. The following describes, with reference to FIG. 1A, the multicast forwarding method provided in this embodiment of the present disclosure.

Step 101: The BFER determines, according to information that is about a multicast group in a multicast receiver list and that is obtained in advance, an IP address of a registration router that supports the multicast group, where the registration router has a capability of processing a multicast registration message.

For example, the multicast receiver is a device for receiving a multicast packet. For example, the multicast receiver may be a host, a set top box (STB), or another device. No examples are given herein for description.

For example, the multicast receiver list may be pre-configured on the BFER, or may be a set of an entry that is generated by the BFER according to a multicast group member packet received from the multicast receiver. The multicast receiver list includes one or more multicast receiver entries. Each multicast receiver entry includes information about a multicast group and information about one or more multicast receivers corresponding to the information about the multicast group, where the information about the multicast receiver may include an IP address of an interface of the multicast receiver, and the interface of the multicast receiver is an interface for receiving a multicast packet.

For example, if a multicast receiver entry corresponding to the information about the multicast group exists on the BFER, the BFER may update, according to the IP address of the multicast receiver, the multicast receiver entry corresponding to the information about the multicast group, for example, add the IP address of the multicast receiver to the multicast receiver entry corresponding to the information about the multicast group. If no multicast receiver entry corresponding to the information about the multicast group exists on the BFER, the BFER may generate, according to the information about the multicast group and the IP address of the multicast receiver, a multicast receiver entry corresponding to the information about the multicast group, where the multicast receiver entry corresponding to the information about the multicast group includes the information about the multicast group and the IP address of the multicast receiver.

For example, the information about the multicast group includes an IP address of the multicast group, or the information about the multicast group includes an IP address of the multicast group and an IP address of a multicast source, where the multicast source corresponds to the multicast group. For example, if Internet Group Management Protocol (IGMP) v2/multicast listener discovery (MLD) protocol v1 is used for the multicast group member packet, the information about the multicast group includes the IP address of the multicast group. If IGMPv3/MLDv2 is used for the multicast group member packet, the information about the multicast group includes the IP address of the multicast group and the IP address of the multicast source.

For example, the registration router has a capability of processing the multicast registration message. That is, the registration router has a capability of receiving and processing the multicast registration message.

For example, the multicast receiver list may be a list statically configured on the BFER, or the multicast receiver list may be a list generated by the BFER. For example, the BFER generates a multicast receiver entry according to a multicast group member packet received from a multicast receiver, and the multicast receiver list includes the multicast receiver entry generated by the BFER. That the BFER generates the multicast receiver entry is used as an example and includes receiving, by the BFER, the multicast group member packet from the multicast receiver, where the multicast group member packet includes information about a multicast group and the IP address of the multicast receiver, and obtaining, by the BFER, the multicast receiver entry according to the information about the multicast group and the IP address of the multicast receiver. If the multicast group member packet is used to request to join the multicast group corresponding to the information about the multicast group, the BFER may generate the multicast receiver entry according to the multicast group member packet. If the multicast group member packet is used to request to leave the multicast group corresponding to the information about the multicast group, the BFER may delete the generated multicast receiver entry according to the multicast group member packet. IGMP/MLD may be used for the multicast group member packet, and the multicast group member packet is not described herein again.

For example, determining, by a BFER according to information that is about a multicast group in a multicast receiver list and that is obtained in advance, an IP address of a registration router that supports the multicast group includes determining, by the BFER according to the information about the multicast group in the multicast receiver list and information about a multicast group supported by at least one registration router, the IP address of the registration router that supports the multicast group in the multicast receiver list. The at least one registration router includes the registration router that supports the multicast group in the multicast receiver list. The BFER may obtain the information about the multicast group supported by the at least one registration router and an IP address of the at least one registration router by means of static configuration or an advertisement packet.

Step 102: The BFER generates a BFER registration message according to the information about the multicast group and the IP address of the registration router.

For example, the multicast registration message may include the BFER registration message. The BFER registration message is used by the BFER to register with the registration router. The BFER registration message includes the information about the multicast group. If the BFER registration message is a message sent in a unicast manner, a destination IP address of the BFER registration message is the IP address of the registration router, and a source IP address of the BFER registration message is an IP address of the BFER. If the BFER registration message is a message sent in a tunnel manner, a destination IP address of the tunnel is the IP address of the registration router, and a source IP address of the tunnel is an IP address of the BFER.

Alternatively, the multicast registration message may include the BFER registration message and a multicast source registration message. The multicast source registration message is used by a router connected to the multicast source to register with the registration router. The multicast source registration message includes the information about the multicast group. The router connected to the multicast source may be a router directly connected to the multicast source. If the multicast source registration message is a message sent in a unicast manner, a destination IP address of the multicast source registration message is the IP address of the registration router, and a source IP address of the multicast source registration message is an IP address of the router connected to the multicast source.

Step 103: The BFER sends the BFER registration message to the registration router.

For example, sending, by the BFER, the BFER registration message to the registration router may include sending, by the BFER, the BFER registration message to the registration router in a unicast manner, where the BFER registration message is a PIM join message, a BGP update message, or a LISP map-register message, and a format of the BFER registration message is not described herein again.

For example, the sending, by the BFER, the BFER registration message to the registration router may include sending, by the BFER, an encapsulated BFER registration message to the registration router through a tunnel, where the encapsulated BFER registration message includes a destination IP address of the tunnel, a source IP address of the tunnel, and the BFER registration message, the destination IP address of the tunnel is the IP address of the registration router, and the source IP address of the tunnel is the IP address of the BFER. The BFER registration message may be the PIM join message, and the PIM join message may be sent to the registration router through the tunnel.

Optionally, before step 101, the multicast forwarding method provided in this embodiment of the present disclosure further includes obtaining, by the BFER, information about the at least one registration router according to statically configured information, where the statically configured information includes the information about the at least one registration router, and the information about the at least one registration router includes the IP address of the at least one registration router and the information about the multicast group supported by the at least one registration router. The statically configured information may include information about one or more routers having a capability of processing a multicast registration message, where the one or more routers having a capability of processing a multicast registration message may be the at least one registration router, and the at least one registration router includes the registration router that supports the multicast group in the multicast receiver list.

Optionally, before step 101, the multicast forwarding method provided in this embodiment of the present disclosure further includes receiving, by the BFER, an advertisement packet, where the advertisement packet is used to advertise that the at least one registration router has a capability of processing the multicast registration message, the advertisement packet includes the information about the at least one registration router, and the information about the at least one registration router includes the IP address of the at least one registration router and the information about the multicast group supported by the at least one registration router, and obtaining, by the BFER using the advertisement packet, the IP address of the at least one registration router and the information about the multicast group supported by the at least one registration router.

For example, if the information about the multicast group includes the IP address of the multicast group, the advertisement packet may include an address range of the multicast group supported by the at least one registration router, where the address range of the multicast group supported by the at least one registration router may include the IP address of the multicast group. If the information about the multicast group includes the IP address of the multicast group and the IP address of the multicast source, the advertisement packet may include an address range of the multicast group supported by the at least one registration router and an address range of the multicast source supported by the at least one registration router, where the address range of the multicast group supported by the at least one registration router includes the IP address of the multicast group, and the address range of the multicast source supported by the at least one registration router includes the IP address of the multicast source.

For example, the BFER may receive the advertisement packet sent by the at least one registration router, the BFER receives the advertisement packet that is sent by the at least one registration router using a proxy router, or the BFER receives the advertisement packet sent by another BFR. For example, the at least one registration router may send a bootstrap message to the BFER using a bootstrap router (BSR). The bootstrap message is used to advertise that the at least one registration router has a capability of processing a multicast registration message, and the bootstrap message may include the IP address of the at least one registration router and the information about the multicast group supported by the at least one registration router.

For example, the advertisement packet is an OSPF router information opaque LSA, the OSPF router information opaque LSA includes a TLV, and the TLV is used to carry the information about the multicast group and an identifier indicating that the registration router has the capability of processing the multicast registration message. Alternatively, the advertisement packet is a packet including an IS-IS router capability TLV, the IS-IS router capability TLV includes a sub-TLV, and the sub-TLV is used to carry the information about the multicast group and an identifier indicating that the registration router has the capability of processing the multicast registration message.

In the method provided in this embodiment of the present disclosure, a BFR used as a BFER may determine, according to information about a multicast group in a multicast receiver list and information about one or more registration routers, an IP address of a registration router that supports the multicast group in the multicast receiver list. The BFR used as a BFER may generate a BFER registration message according to the information about the multicast group and the IP address of the registration router. The BFER registration message may include information about a multicast group that the multicast receiver intends to join and an IP address of the BFER. The registration router that receives the BFER registration message may obtain a BFER entry according to the information about the multicast group and the IP address of the BFER that are carried in the BFER registration message, where the BFER entry may help a BFIR generate a BIER multicast packet. Therefore, interconnection and intercommunication are implemented between a BIER network and a conventional multicast network.

Optionally, after step 103, the multicast forwarding method provided in this embodiment of the present disclosure further includes obtaining, by the BFER, a BFER deregistration message after an entry included in the multicast receiver list is deleted, where the deleted entry includes information about a multicast group, and the BFER deregistration message includes the information about the multicast group in the deleted entry and the IP address of the BFER, and sending, by the BFER, the BFER deregistration message to the registration router. The information about the multicast group in the deleted entry is information about the deleted multicast group.

For example, sending, by the BFER, the BFER deregistration message to the registration router may include sending, by the BFER, the BFER deregistration message to the registration router in a unicast manner, where the BFER deregistration message is a PIM prune message or a BGP update message, and a format of the BFER deregistration message is not described herein again.

For example, sending, by the BFER, the BFER deregistration message to the registration router may include sending, by the BFER, the BFER deregistration message to the registration router through a tunnel, where a destination IP address of the tunnel is the IP address of the registration router, and a source IP address of the tunnel is the IP address of the BFER. A packet header may be encapsulated outside the BFER deregistration message, and the packet header may include the source IP address of the tunnel and the destination IP address of the tunnel. The BFER deregistration message may be the PIM prune message, and the PIM prune message may be sent to the registration router through the tunnel.

For example, the BFER may detect the multicast receiver list on the BFER. If the BFER detects that an entry in the multicast receiver list is deleted, the BFER obtains the BFER deregistration message.

For example, after receiving a multicast group member leave packet sent by the multicast receiver, the BFER may delete the entry in the multicast receiver list. The multicast group member leave packet includes the information about the deleted multicast group. The multicast group member leave packet belongs to the multicast group member packet, and the multicast group member leave packet is used to indicate that the multicast receiver requests to leave the multicast group.

Figure 1B:
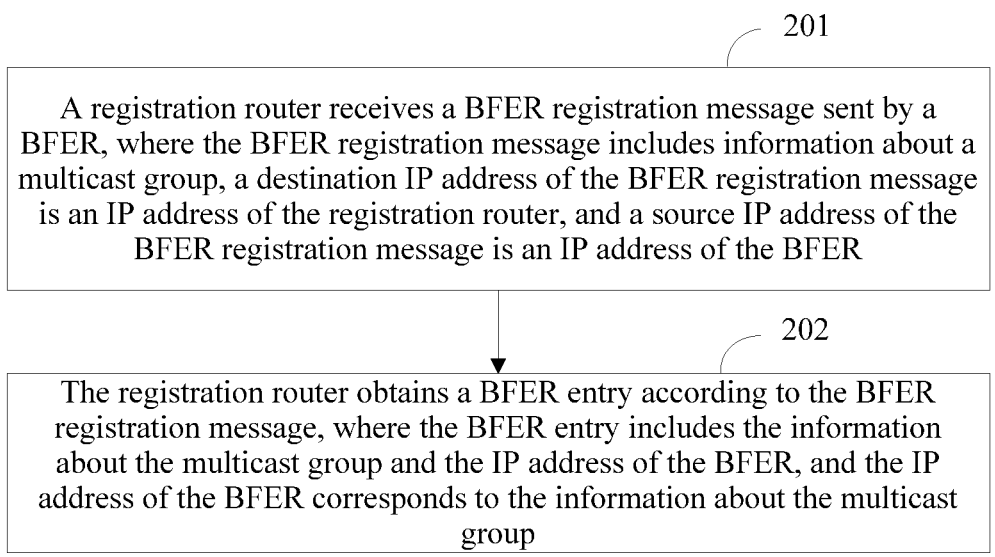
FIG. 1B is a flowchart of a multicast forwarding method according to an embodiment of the present disclosure.

FIG. 1B is a flowchart of a multicast forwarding method according to an embodiment of the present disclosure. The multicast forwarding method in the embodiment corresponding to FIG. 1B is described from the perspective of a registration router. The registration router may be a BFR in a BIER network. The registration router may have a function of a BFIR. That is, the registration router may generate a BIER multicast packet. The following describes, with reference to FIG. 1B, the multicast forwarding method provided in this embodiment of the present disclosure.

Step 201: The registration router receives a BFER registration message sent by a BFER, where the BFER registration message includes information about a multicast group, a destination IP address of the BFER registration message is an IP address of the registration router, and a source IP address of the BFER registration message is an IP address of the BFER.

For example, the registration router may be the registration router in the embodiment corresponding to FIG. 1A, and details are not described herein again. The BFER may be the BFER in the embodiment corresponding to FIG. 1A, and details are not described herein again. The multicast registration message may be the multicast registration message in the embodiment corresponding to FIG. 1A. That is, the multicast registration message may include the BFER registration message, or the multicast registration message may include the BFER registration message and a multicast source registration message. The multicast source registration message may be the multicast source registration message in the embodiment corresponding to FIG. 1A, and details are not described herein again.

Step 202: The registration router obtains a BFER entry according to the BFER registration message, where the BFER entry includes the information about the multicast group and the IP address of the BFER, and the IP address of the BFER corresponds to the information about the multicast group.

For example, obtaining, by the registration router, a BFER entry according to the BFER registration message includes obtaining, by the registration router, the information about the multicast group and the IP address of the BFER from the BFER registration message, and generating, by the registration router, the BFER entry according to the information about the multicast group and the IP address of the BFER.

For example, if one or more BFER entries corresponding to the IP address of the BFER are already stored on the registration router, the registration router may update the one or more stored BFER entries, that is, generate the BFER entry according to the information about the multicast group corresponding to the IP address of the BFER in order to increase a quantity of BFER entries corresponding to the IP address of the BFER. Alternatively, if one or more BFER entries corresponding to the information about the multicast group are already stored on the registration router, the registration router may update the one or more stored BFERs, that is, generate the BFER entry according to the information about the multicast group corresponding to the IP address of the BFER in order to increase a quantity of BFER entries corresponding to the information about the multicast group.

For example, if the information about the multicast group includes an IP address of the multicast group, the BFER entry includes the IP address of the multicast group and the IP address of the BFER, and the IP address of the multicast group corresponds to the IP address of the BFER. If the information about the multicast group includes an IP address of the multicast group and an IP address of the multicast source, the BFER entry includes the IP address of the multicast source, the IP address of the multicast group, and the IP address of the BFER. The IP address of the multicast group, the IP address of the multicast source, and the IP address of the BFER are in a one-to-one correspondence.

Optionally, the BFER entry may further include an aging time. That is, after the BFER entry reaches the preset aging time, the BFER entry becomes invalid. In other words, the BFER entry is deleted after the BFER entry reaches the preset aging time.

Optionally, after step 202, the multicast forwarding method provided in this embodiment of the present disclosure further includes generating, by the registration router, a BIER multicast packet according to a received multicast packet, and sending, by the registration router, the BIER multicast packet to the BFER.

For example, generating, by the registration router, a BIER multicast packet according to a received multicast packet includes receiving, by the registration router, a multicast packet sent by a router connected to a multicast source, where the multicast packet includes the information about the multicast group, determining, by the registration router, the BFER entry according to the information about the multicast group included in the multicast packet, obtaining, by the registration router, the IP address of the BFER according to the BFER entry, and obtaining, by the registration router, the BIER multicast packet according to the IP address of the BFER and the multicast packet, where the BIER multicast packet includes a BIER header and the multicast packet, the BIER header includes a bit string, and a bit, in the bit string, corresponding to the BFER is set.

For example, the router connected to the multicast source may send an encapsulated packet to the registration router through a tunnel, where the encapsulated packet includes a packet header and a multicast packet that is sent by the multicast source to the router connected to the multicast source. The multicast packet includes the information about the multicast group. The multicast packet may be a multicast data packet, and the multicast data packet may carry data sent by the multicast source. The packet header includes a source IP address of the tunnel and a destination IP address of the tunnel. The source IP address of the tunnel is an IP address of the router connected to the multicast source, and a destination IP address of the tunnel may be the IP address of the registration router.

For example, if the information about the multicast group includes the IP address of the multicast group, the registration router may obtain the IP address of the BFER according to one or more BFER entries and the IP address of the multicast group that is included in the multicast packet. If the information about the multicast group includes the IP address of the multicast group and the IP address of the multicast source, the registration router may obtain the IP address of the BFER according to one or more BFER entries, and the IP address of the multicast group and the IP address of the multicast source that are included in the multicast packet. The one or more BFER entries include a BFER entry corresponding to the information about the multicast group.

For example, obtaining, by the registration router, the BIER multicast packet according to the IP address of the BFER and the multicast packet includes obtaining, by the registration router according to the IP address of the BFER, a bit string corresponding to the BFER, and generating, by the registration router, the BIER multicast packet according to the multicast packet and the bit string.

For example, the registration router may pre-store a correspondence between the IP address of the BFER and an ID of the BFER, where the ID of the BFER is identification information of the BFER in the BIER network. The registration router may obtain the ID of the BFER according to the IP address of the BFER, and the registration router may obtain, by means of calculation, the bit string according to the ID of the BFER. For example, if the BIER network includes M BFRs, M is less than or equal to 256, and the bit string includes 256 bits, one bit in the bit string may uniquely identify one of the M BFRs, and the registration router may obtain the bit string according to the ID of the BFER. Alternatively, the registration router may obtain, by means of calculation, the bit string and a set identifier (SI) according to the ID of the BFER. For example, if the BIER network includes N BFRs, N is greater than 256, and the bit string includes 256 bits, one bit in the bit string cannot identify one of the N BFRs, and the registration router needs to obtain the bit string and the SI according to the ID of the BFER. The SI and one bit in the bit string may be used to identify one of the N BFRs. Correspondingly, the BIER header of the BIER packet obtained by the registration router further includes the SI. A BFR that receives the BIER packet including the SI may further learn, according to the SI and the bit string that are in the BIER header, a BFER corresponding to the SI and the bit string. The BFR may send the BIER packet to the BFER.

For example, if the multicast packet is sent to L BFERs, where L is an integer greater than or equal to 1, L bits in the bit string obtained by the registration registration router by means of calculation are set. Any bit in the L bits is used to identify one of the L BFERs, and the L bits are in a one-to-one correspondence with the L BFERs.

For example, the registrar may further store a correspondence, and the correspondence includes the IP address of the BFER and a bit in the bit string corresponding to the BFER. For example, a bit corresponding to the IP address of the BFER is 1 bit in the bit string, that is, the second bit starting from a least significant bit (LSB) of the bit string. The registrar may obtain, according to the correspondence and the IP address of the BFER, the bit in the bit string corresponding to the BFER, and the registrar sets the bit in the bit string corresponding to the BFER to obtain the bit string corresponding to the BFER. The registrar may obtain the BIER multicast packet according to the bit string and the received multicast packet.

Optionally, before step 201, the multicast forwarding method provided in this embodiment of the present disclosure further includes sending, by the registration router, an advertisement packet in the BIER network, where the advertisement packet is used to advertise that the registration router has a capability of processing the multicast registration message, and the advertisement packet includes the IP address of the registration router and the information about the multicast group. For example, a format of the advertisement packet in the embodiment corresponding to FIG. 1A may be used for the advertisement packet, and details are not described herein again. For example, the registration router may send the advertisement packet in the BIER network in a flood manner such that the BFER in the BIER network can receive the advertisement packet.

In this embodiment of the present disclosure, a registration router may be used as a BFIR in a BIER network, and after receiving a BFER registration packet sent by a BFER, the registration router obtains a BFER entry according to an IP address of the BFER and information about a multicast group that are in the BFER registration packet. Once the registration router receives a multicast packet corresponding to the information about the multicast group, the registration router may obtain a BIER multicast packet according to the BFER entry and the multicast group packet. The registration router sends the BIER multicast packet to the BFER in order to help implement rapid deployment of a BIER technology in a conventional multicast network, and implement interconnection and intercommunication between a BIER network and the conventional multicast network.

Optionally, after step 202, the multicast forwarding method provided in this embodiment of the present disclosure further includes receiving, by the registration router, a BFER deregistration message sent by the BFER, where the BFER deregistration message includes the IP address of the BFER and information about a deleted multicast group, determining, by the registration router, a to-be-deleted BFER entry according to the information about the deleted multicast group and the IP address of the BFER, and deleting, by the registration router, the to-be-deleted BFER entry.

For example, if the information about the multicast group includes the IP address of the multicast group, and the BFER entry includes the IP address of the multicast group and the IP address of the BFER, the registration router may determine the to-be-deleted BFER entry according to the BFER deregistration message, where the BFER deregistration message includes an IP address of the deleted multicast group, and the to-be-deleted BFER entry is a BFER entry including the IP address of the deleted multicast group. If the information about the multicast group includes the IP address of the multicast group and the IP address of the multicast source, and the BFER entry includes the IP address of the multicast group, the IP address of the multicast source, and the IP address of the BFER, the registration router may determine the to-be-deleted BFER entry according to the BFER deregistration message, where the BFER deregistration message includes an IP address of the deleted multicast group, and the to-be-deleted BFER entry is a BFER entry including the IP address of the deleted multicast group.

For example, deleting, by the registration router, the to-be-deleted BFER entry may be emptying the to-be-deleted BFER entry, clearing the information about the multicast group in the to-be-deleted BFER entry, or clearing the IP address of the BFER in the to-be-deleted BFER entry. After deleting the to-be-deleted BFER entry, the registration router cannot obtain a bit string corresponding to the to-be-deleted BFER entry, and the registration router no longer sends a BIER packet to a BFER corresponding to the to-be-deleted BFER entry.

Figure 2A:
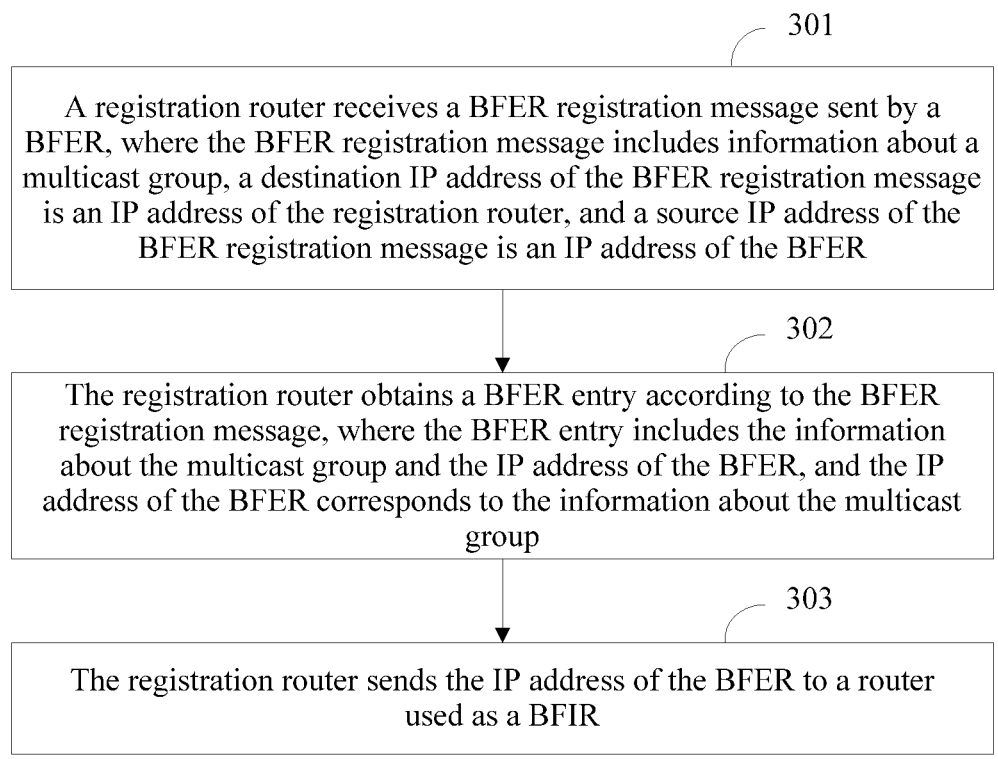
FIG. 2A is a flowchart of another multicast forwarding method according to an embodiment of the present disclosure.

FIG. 2A is a flowchart of another multicast forwarding method according to an embodiment of the present disclosure. The multicast forwarding method in the embodiment corresponding to FIG. 2A is described from the perspective of a registration router. The registration router may not have a function of a BFIR, and the registration router has a capability of processing a multicast registration message. The multicast registration message may include a BFER registration message, or the multicast registration message may include the BFER registration message and a multicast source registration message. The following describes, with reference to FIG. 2A, the multicast forwarding method provided in this embodiment of the present disclosure.

Step 301: The registration router receives a BFER registration message sent by a BFER, where the BFER registration message includes information about a multicast group, a destination IP address of the BFER registration message is an IP address of the registration router, and a source IP address of the BFER registration message is an IP address of the BFER.

Step 301 in this embodiment of the present disclosure may be the same as step 201 in the embodiment corresponding to FIG. 1B, and details are not described herein again.

Step 302: The registration router obtains a BFER entry according to the BFER registration message, where the BFER entry includes the information about the multicast group and the IP address of the BFER, and the IP address of the BFER corresponds to the information about the multicast group.

Step 302 in this embodiment of the present disclosure may be the same as step 202 in the embodiment corresponding to FIG. 1B, and details are not described herein again.

Optionally, before step 301, the multicast forwarding method provided in this embodiment of the present disclosure further includes sending, by the registration router, an advertisement packet in the BIER network, where the advertisement packet is used to advertise that the registration router has a capability of processing the multicast registration message, and the advertisement packet includes the IP address of the registration router and the information about the multicast group. For example, a format of the advertisement packet in the embodiment corresponding to FIG. 1A may be used for the advertisement packet, and details are not described herein again. A sending manner of the advertisement packet may be the same as a sending manner of the advertisement packet in the embodiment corresponding to FIG. 1B, and details are not described herein again.

Optionally, before step 301, after the registration router sends the advertisement packet, the multicast forwarding method provided in this embodiment of the present disclosure further includes obtaining, by the registration router from a router connected to a multicast source, the information about the multicast group and an IP address of the router connected to the multicast source.

For example, obtaining, by the registration router from a router connected to a multicast source, the information about the multicast group and an IP address of the router connected to the multicast source includes receiving, by the registration router, an encapsulated packet that is sent through a tunnel by the router connected to the multicast source, where the encapsulated packet includes a packet header and a multicast packet that is sent by the multicast source to the router connected to the multicast source, the multicast packet includes the information about the multicast group, and a source IP address of the tunnel in the packet header is the IP address of the router connected to the multicast source, and obtaining, by the registration router from the multicast packet, the information about the multicast group, and obtaining, from the packet header, the IP address of the router connected to the multicast source.

Alternatively, obtaining, by the registration router from a router connected to a multicast source, the information about the multicast group and an IP address of the router connected to the multicast source includes receiving, by the registration router, a multicast source registration message sent by the router connected to the multicast source, where the multicast source registration message includes the information about the multicast group and the IP address of the router connected to the multicast source, and obtaining, by the registration router from the multicast source registration message, the information about the multicast group and the IP address of the router connected to the multicast source. The router connected to the multicast source may send the multicast source registration message in a unicast manner, and details are not described herein again. If the multicast registration message includes the multicast source registration message, the registration router can process the received multicast source registration message to obtain, according to the multicast source registration message, the information about the multicast group and the IP address of the router connected to the multicast source.

Optionally, if the router connected to the multicast source may be used as a BFIR in the BIER network, after the registration router obtains the information about the multicast group and the IP address of the router connected to the multicast source, the multicast forwarding method provided in this embodiment of the present disclosure further includes the following step in FIG. 2A.

Step 303: The registration router sends the IP address of the BFER to a router used as a BFIR.

For example, sending, by the registration router, the IP address of the BFER to a router used as a BFIR includes determining, by the registration router according to the information about the multicast group, the BFER entry corresponding to the multicast group, obtaining, by the registration router, a BFER list message according to the BFER entry corresponding to the multicast group and the IP address of the router connected to the multicast source, where the BFER list message includes the IP address of the BFER corresponding to the multicast group, and a destination IP address of the BFER list message is the IP address of the router connected to the multicast source, and sending, by the registration router, the BFER list message to the router connected to the multicast source. The router connected to the multicast source may be the router used as a BFIR.

For example, the router connected to the multicast source is a BFIR that can generate a BIER multicast packet. The BFER list message may directly carry the IP address of the BFER corresponding to the multicast group, or the BFER list message may carry the BFER entry. The BFER entry may include the IP address of the BFER and the information about the multicast group.

In this embodiment of the present disclosure, after receiving a BFER registration packet sent by a BFER, a registration router obtains a BFER entry according to an IP address of the BFER and information about a multicast group that are in the BFER registration packet. The registration router sends the IP address of the BFER in the BFER entry to a router used as a BFIR, and once the router used as a BFIR receives a multicast packet corresponding to the information about the multicast group, the router used as a BFIR may obtain a BIER multicast packet according to the IP address of the BFER and the multicast group packet. The router used as a BFIR may send the BIER multicast packet to the BFER in order to help implement rapid deployment of a BIER technology in a conventional multicast network, and implement interconnection and intercommunication between a BIER network and the conventional multicast network.

Optionally, after step 302, the multicast forwarding method provided in this embodiment of the present disclosure further includes receiving, by the registration router, a BFER deregistration message sent by the BFER, where the BFER deregistration message includes the IP address of the BFER and information about a deleted multicast group, determining, by the registration router, a to-be-deleted BFER entry according to the information about the deleted multicast group and the IP address of the BFER, and deleting, by the registration router, the to-be-deleted BFER entry. For example, the registration router may delete the to-be-deleted BFER entry using a method for deleting the to-be-deleted BFER entry in the embodiment corresponding to FIG. 1B, and details are not described herein again.

Optionally, after the registration router deletes the to-be-deleted BFER entry, the multicast forwarding method provided in this embodiment of the present disclosure further includes instructing, by the registration router, the router used as a BFIR to delete the to-be-deleted IP address of the BFER. The router used as a BFIR may be the router connected to the multicast source. For example, the registration router may send, in a unicast manner to the router used as a BFIR, a message for instructing to delete the to-be-deleted IP address of the BFER. The registration router may use a PIM message, a LISP message, or a BGP message to instruct the router used as a BFIR, and a specific format of the message is not described herein again.

Figure 2B:
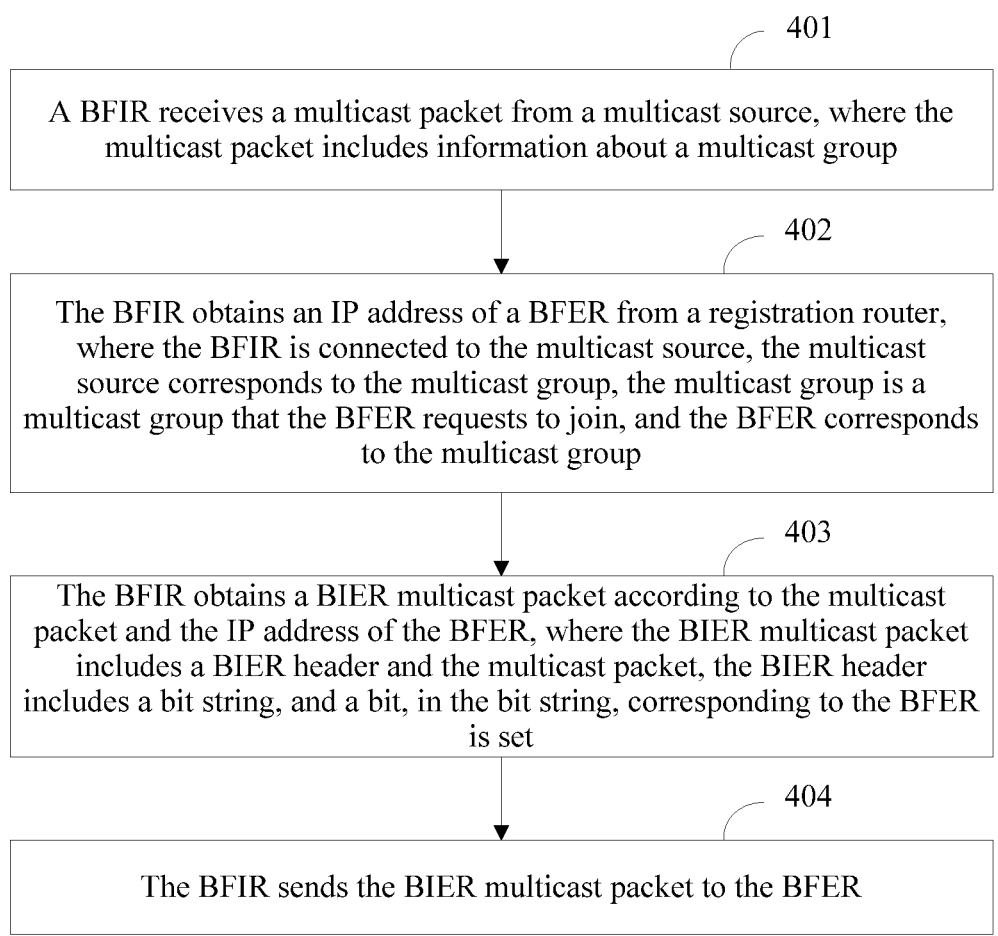
FIG. 2B is a flowchart of another multicast forwarding method according to an embodiment of the present disclosure.

FIG. 2B is a flowchart of another multicast forwarding method according to an embodiment of the present disclosure. The multicast forwarding method in the embodiment corresponding to FIG. 2B is described from the perspective of a BFIR. The BFIR may be the router connected to the multicast source in the embodiment corresponding to FIG. 1A, FIG. 1B, or FIG. 2A. If the multicast registration message includes a BFER registration message, the BFIR may send a multicast packet to a registration router. If the multicast registration message includes the BFER registration message and a multicast source registration message, the BFIR may send the multicast packet or the multicast source registration message to the registration router to implement multicast source registration. The following describes, with reference to FIG. 2B, the multicast forwarding method provided in this embodiment of the present disclosure.

Step 401: The BFIR receives a multicast packet from the multicast source, where the multicast packet includes information about the multicast group.

For example, the multicast packet may be a multicast data packet, and the multicast packet may be the multicast packet received by the router connected to the multicast source in the embodiment corresponding to FIG. 1A, FIG. 1B, or FIG. 2A, and details are not described herein again.

Step 402: The BFIR obtains an IP address of a BFER from the registration router, where the BFIR is connected to the multicast source, the multicast source corresponds to the multicast group, the multicast group is a multicast group that the BFER requests to join, and the BFER corresponds to the multicast group.

For example, the IP address of the BFER may be the IP address of the BFER sent by the registration router in the embodiment corresponding to FIG. 2A, and details are not described herein again. The registration router may be the registration router in the embodiment corresponding to FIG. 2A, and details are not described herein again. The BFER is a BFER that requests to join the multicast group. That is, the BFER corresponds to the multicast group. In this embodiment of the present disclosure, a process in which the BFER requests to join the multicast group belongs to a registration process of the BFER.

For example, obtaining, by the BFIR, an IP address of a BFER from the registration router includes receiving, by the BFIR, a BFER list message sent by the registration router, where the BFER list message includes the IP address of the BFER, a destination IP address of the BFER list message is an IP address of the BFIR, and a source IP address of the BFER list message is an IP address of the registration router, and obtaining, by the BFIR, the IP address of the BFER from the BFER list message. The registration router may send the BFER list message to the BFIR after receiving the multicast packet or the multicast source registration message from the BFIR.

For example, before receiving, by the BFIR, a BFER list message sent by the registration router, the method provided in this embodiment of the present disclosure further includes sending, by the BFIR, an encapsulated packet to the registration router in a tunnel manner, where the encapsulated packet includes a packet header and the multicast packet that is sent by the multicast source to the router connected to the multicast source, the packet header includes a source IP address of the tunnel and a destination IP address of the tunnel, the multicast packet includes the information about the multicast group, and the source IP address of the tunnel is the IP address of the router connected to the multicast source. The multicast packet is used to implement multicast source registration. A manner in which the BFIR sends the multicast packet is the same as a manner in which the router connected to the multicast source sends the multicast packet in the embodiment corresponding to FIG. 1B or FIG. 2A, and details are not described herein again.

Alternatively, for example, before receiving, by the BFIR, a BFER list message sent by the registration router, the method provided in this embodiment of the present disclosure further includes sending, by the BFIR, a multicast source registration message to the registration router, where the multicast source registration message includes the information about the multicast group and the IP address of the router connected to the multicast source. The multicast source registration message is used to implement multicast source registration. If the advertisement packet may be used to advertise that the registration router has a capability of processing the multicast source registration message, after obtaining the IP address of the registration router, the BFIR may send the multicast source registration message to the registration router. A manner in which the BFIR sends the multicast source registration message is the same as a manner in which the router connected to the multicast source sends the multicast source registration message in the embodiment corresponding to FIG. 1B or FIG. 2A, and details are not described herein again.

Step 403: The BFIR obtains a BIER multicast packet according to the multicast packet and the IP address of the BFER, where the BIER multicast packet includes a BIER header and the multicast packet, the BIER header includes a bit string, and a bit, in the bit string, corresponding to the BFER is set.

For example, a method in which the BFIR obtains the BIER multicast packet is the same as a method in which the registration router obtains the BIER multicast packet in the embodiment corresponding to FIG. 1B or FIG. 2A, and details are not described herein again.

Step 404: The BFIR sends the BIER multicast packet to the BFER.

For example, a method in which the BFIR sends the BIER multicast packet is the same as a method in which the registration router sends the BIER multicast packet in the embodiment corresponding to FIG. 1B or FIG. 2A, and details are not described herein again.

Optionally, before step 401, the multicast forwarding method provided in this embodiment of the present disclosure further includes obtaining, by the BFIR, an IP address of at least one registration router by means of static configuration. The BFIR may pre-configure the IP address of the at least one registration router. The at least one registration router includes a registration router that supports the multicast group.

Optionally, before step 401, the multicast forwarding method provided in this embodiment of the present disclosure further includes obtaining, by the BFIR, an IP address of at least one registration router using a received advertisement packet, where the advertisement packet is used to identify that the at least one registration router has a function of processing the multicast registration message, and the advertisement packet includes the IP address of the at least one registration router and information about a multicast group supported by the at least one registration router. A format of the advertisement packet may be the same as that of the advertisement packet in the embodiment corresponding to FIG. 1A, FIG. 1B, or FIG. 2A, and details are not described herein again. The at least one registration router includes a registration router that supports the multicast group.

In the method provided in this embodiment of the present disclosure, the BFIR may be a router connected to a multicast source. The BFIR may obtain an IP address of a BFER from a registration router. In this way, the BFIR may obtain a BIER multicast packet according to a multicast packet from a multicast source and the IP address of the BFER in order to help implement rapid deployment of a BIER technology in a conventional multicast network, and implement interconnection and intercommunication between a BIER network and the conventional multicast network.

Optionally, after step 401, the multicast forwarding method provided in this embodiment of the present disclosure further includes deleting, by the BFIR, a to-be-deleted BFER entry according to a message that is sent by the registration router and is used to instruct to delete the to-be-deleted BFER entry. A method in which the BFIR deletes the to-be-deleted BFER entry is the same as a method in which the registration router deletes the to-be-deleted BFER entry in the embodiment corresponding to FIG. 1B or FIG. 2A, and details are not described herein again.

Figure 3A:
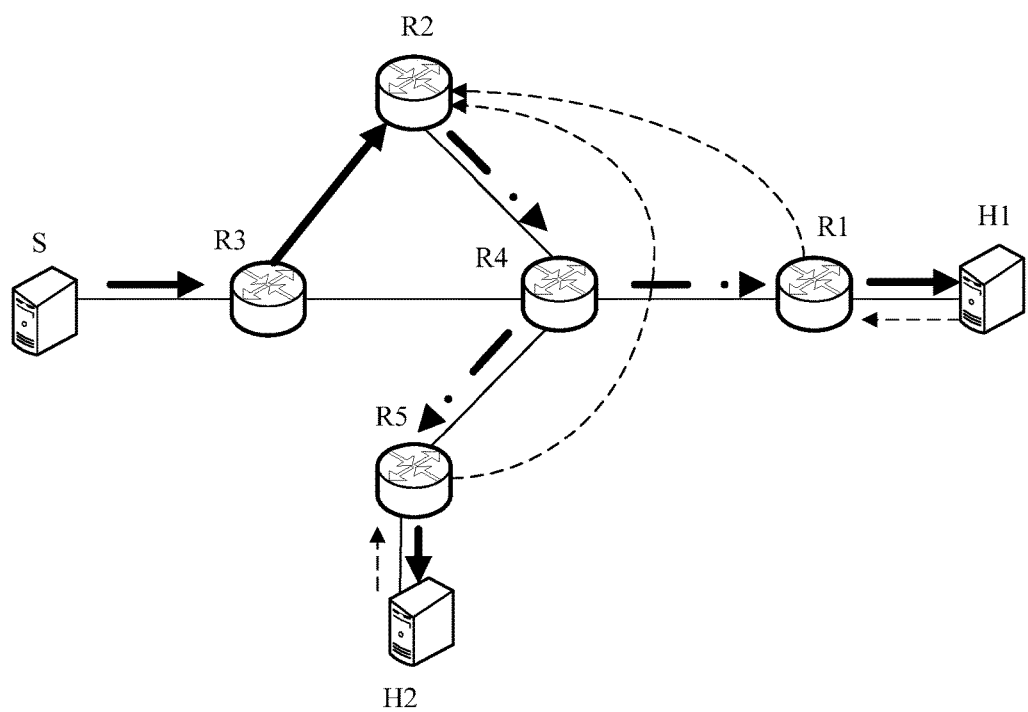
FIG. 3A is a schematic diagram of a network scenario according to an embodiment of the present disclosure.

FIG. 3A is a schematic diagram of a network scenario according to an embodiment of the present disclosure. The network scenario shown in FIG. 3A may correspond to the embodiments/embodiment corresponding to FIG. 1A and/or FIG. 1B. That is, a registration router has a capability of processing a multicast registration message, and the registration router also has a function of a BFIR. In the network scenario shown in FIG. 3A, a first BFER may be represented as an R1, the registration router may be represented as an R2, a router connected to a multicast source may be represented as an R3, an intermediate BFR may be represented as an R4, a second BFER may be represented as an R5, a multicast receiver directly connected to the first BFER may be represented as an H1, a multicast receiver directly connected to the second BFER may be represented as an H2, and the multicast source may be represented as an S. The R3 is connected both to the S and the R4, and the R4 is connected to the R2, the R1, and the R5. In the network scenario shown in FIG. 3A, the R1, the R2, the R3, the R4, and the R5 are BFRs in a BIER network. That is, the R1, the R2, the R3, the R4, and the R5 support a BIER technology. The network scenario shown in FIG. 3A is a simplified schematic diagram. One or more links in four links of a link between the R3 and the R4, a link between the R2 and the R4, a link between the R4 and the R5, and a link between the R4 and the R1 may further include one or more routers, and any router of the one or more routers may be a BFR. No examples are given herein for description.

After learning that the R2 has a capability of receiving and processing the multicast registration message, the R2 may send an advertisement packet to BFRs such as the R1, the R3, and the R5 in the BIER network. The advertisement packet may include an IP address of the R2 and an address range of a multicast group supported by the R2. The address range of the multicast group supported by the R2 includes an IP address of one or more multicast groups. A manner in which the R2 sends the advertisement packet may be the same as a manner in which the registration router sends the advertisement packet in the embodiment corresponding to FIG. 1A or FIG. 1B, and details are not described herein again.

In another implementation manner, the R3, the R1, and the R5 may pre-configure the IP address of the R2 and information indicating that the R2 is a registration router, and a specific configuration process is not described herein again.

That the H1 joins a multicast group corresponding to the S is used as an example. The H1 sends a multicast group member packet such as an IGMP report message to the R1, where the IGMP report message may include an identifier of the H1 and an IP address of the multicast group. The H1 may obtain in advance the IP address of the multicast group that the H1 intends to join. The identifier of the H1 may be an IP address of an interface by which the H1 receives a multicast packet. That is, the identifier of the H1 may be an IP address of the H1.

After receiving the IGMP report message, the R1 generates an IGMP entry according to the IGMP report message. The IGMP entry includes the IP address of the multicast group and the IP address of the H1. The R1 obtains a first BFER registration message according to the IP address of the multicast group, where the first BFER registration message includes the IP address of the multicast group and an IP address of the R1. The R1 sends the first BFER registration message to the R2. The first BFER registration message may be a PIM join message, a BGP update message, or a LISP map-register message.

The R3 obtains, by means of static configuration or using the advertisement packet sent by the R2, the IP address of the R2 and the address range of the multicast group supported by the R2. After the R3 obtains a multicast packet from the S, where the multicast packet includes the IP address of the multicast group, the R3 determines, according to the IP address of the multicast group, that a registration router that supports the multicast group is the R2. The R3 sends the multicast packet to the R2 according to the obtained IP address of the R2. The R3 may send the multicast packet to the R2 through a tunnel. The tunnel is a LISP tunnel, a Generic Routing Encapsulation (GRE) tunnel, a User Datagram Protocol (UDP) tunnel, or the like. No examples are given herein for description.

After receiving the first BFER registration message, the R2 generates a first BFER entry according to the IP address of the R1 and the IP address of the multicast group that are included in the first BFER registration message. After receiving the multicast packet from the R3, the R2 determines the IP address of the R1 according to the first BFER entry and the IP address of the multicast group in the multicast packet. Because the R2 has a function of a BFIR, the R2 may obtain, according to the IP address of the R1, a bit string corresponding to the R1. A bit, included in the bit string, corresponding to the R1 is set. The R2 generates a BIER multicast packet according to the bit string and the multicast packet. The BIER multicast packet includes a BIER header and the multicast packet. The BIER header includes the bit string, and the bit, in the bit string, corresponding to the R1 is set. The R2 sends the BIER multicast packet to the R4.

A BFR in the BIER network may learn a BFER corresponding to each bit in the bit string. The BFR in the BIER network may route the BIER packet to the R1 according to the bit string in the BIER header. For example, after receiving the BIER multicast packet, the R4 learns, according to the bit that is set in the bit string in the BIER header, that the BIER multicast packet needs to be routed to the R1, and the R4 sends the BIER multicast packet to the R1.

After receiving the BIER multicast packet, the R1 removes the BIER header from the BIER multicast packet to obtain the multicast packet. The R1 obtains the IP address of the H1 according to the IP address of the multicast group in the multicast packet and the stored IGMP entry. The R1 sends the multicast packet to the interface corresponding to the IP address of the H1.

If the H2 sends a multicast group member packet to the R5, and the H2 and the H1 request to join the same multicast group, a manner in which the H2 sends the multicast group member packet to the R5 is the same as a manner in which the H1 sends the multicast group member packet to the R1, and details are not described herein again. A manner in which the R5 sends a second BFER registration message to the R2 is the same as a manner in which the R1 sends the first BFER registration message to the R2, and details are not described herein again. The second BFER registration message includes the IP address of the multicast group and an IP address of the R5. A difference is that, the R2 obtains a second BFER entry according to the second BFER registration message that is from the R5. The second BFER entry includes the IP address of the R5 and the IP address of the multicast group. When generating the BIER multicast packet, the R2 may obtain, according to the first BFER entry and the second BFER entry, a bit string including two bits that are set. One bit that is set corresponds to the R1, and the other bit that is set corresponds to the R5. The R2 sends, to the R4, the BIER multicast packet including the two bits that are set. The R4 sends the BIER multicast packet to the R5 and the R1 according to the two bits in the bit string that are set. A manner in which the R5 processes the BIER multicast packet is the same as a manner in which the R1 processes the BIER multicast packet, and details are not described herein again.

In the foregoing embodiment of the present disclosure, an R2 having a multicast registration capability may obtain a first BFER entry according to information about a multicast group that an R1 requests to join and an IP address of the R1. The information about the multicast group that the R1 requests to join is information about a multicast group carried in a first BFER registration message sent by the R1. After receiving a multicast packet from an R3, the R2 may perform, according to the first BFER entry, BIER encapsulation on the multicast packet and forward an encapsulated packet. In this way, a router in a conventional multicast network no longer needs to maintain multicast topology information, and the router in the conventional multicast network does not need to create a multicast topology before forwarding a multicast packet, thereby saving network resources, enabling a BIER network to perform interconnection and intercommunication with the conventional multicast network, and implementing rapid deployment of the BIER multicast network.

Figure 3B:
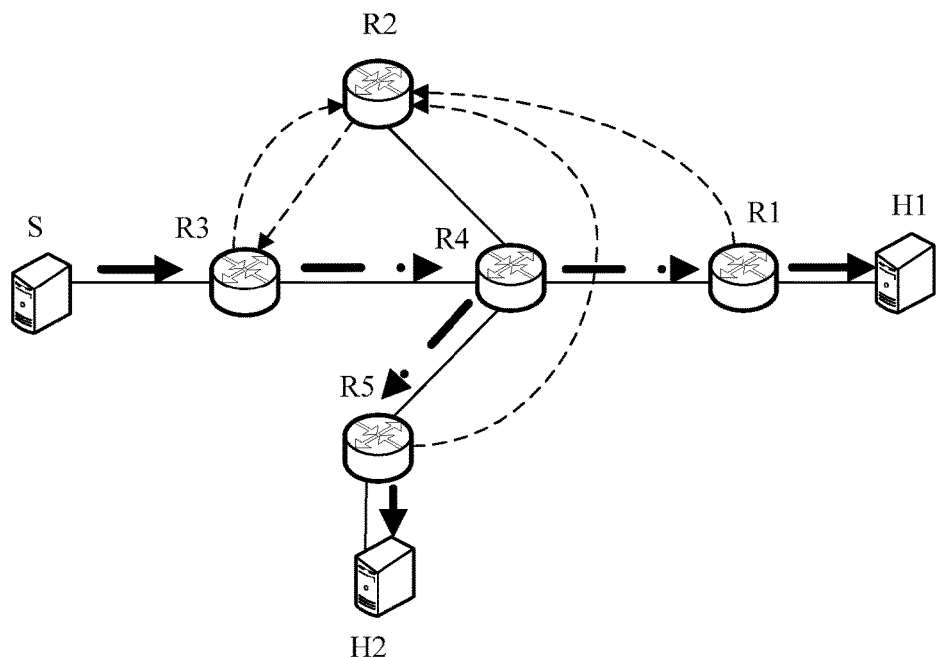
FIG. 3B is a schematic diagram of another network scenario according to an embodiment of the present disclosure.

FIG. 3B is a schematic diagram of another network scenario according to an embodiment of the present disclosure. The network scenario shown in FIG. 3B may correspond to the embodiments/embodiment corresponding to FIG. 2A and/or FIG. 2B. That is, a registration router has a capability of processing a multicast registration message, and a router connected to a multicast source has a function of a BFIR. In the network scenario shown in FIG. 3B, a first BFER may be represented as an R1, the registration router may be represented as an R2, the router connected to the multicast source may be represented as an R3, an intermediate BFR may be represented as an R4, a second BFER may be represented as an R5, a multicast receiver connected to the first BFER may be represented as an H1, a multicast receiver connected to the second BFER may be represented as an H2, and the multicast source may be represented as an S. The R3 is connected both to the S and the R4, and the R4 is connected both to the R2, the R1, the R3, and the R5. In the network scenario shown in FIG. 3B, the R1, the R2, the R3, the R4, and the R5 are BFRs in a BIER network. That is, the R1, the R2, the R3, the R4, and the R5 support a BIER technology. The network scenario shown in FIG. 3B is a simplified schematic diagram. One or more links in four links of a link between the R3 and the R4, a link between the R2 and the R4, a link between the R4 and R5, and a link between the R4 and R1 may further include one or more routers. No examples are given herein for description.

In the network scenario shown in FIG. 3B, the R2 has a capability of processing a multicast source registration message and a BFER registration message. The R3 implements multicast source registration by sending the multicast source registration message to the R2. The R1 implements registration of the first BFER by sending a first BFER registration message to the R2. The R5 implements a second BFER registration by sending the second BFER registration message to the R2. The R3 can generate a BIER multicast packet. Information about a multicast group includes an IP address of the multicast group and an IP address of the multicast source. The H2 and the H1 request to join a same multicast group. Details are as follows.

After learning that the R2 has a capability of receiving and processing the multicast registration message, the R2 may send an advertisement packet to BFRs such as the R1, the R3, and the R5 in the BIER network. The advertisement packet is used to advertise that the R2 has a capability of processing the multicast source registration message and the BFER registration message. The advertisement packet may include an IP address of the R2, an address range of a multicast group supported by the R2, and an address range of a multicast source supported by the R2. The address range of the multicast group supported by the R2 includes an IP address of one or more multicast groups. The address range of the multicast source supported by the R2 includes an IP address of one or more multicast sources. A manner in which the R2 sends the advertisement packet may be the same as a manner in which the registration router sends the advertisement packet in the embodiment corresponding to FIG. 2A or FIG. 2B, and details are not described herein again.

That the H1 joins a multicast group corresponding to the S is used as an example. The H1 sends a multicast group member packet such as an IGMP report message to the R1, where the IGMP report message may include an identifier of the H1, the IP address of the multicast group, and the IP address of the multicast source. The identifier of the H1 may be an IP address of an interface by which the H1 receives a multicast packet. That is, the identifier of the H1 may be an IP address of the H1.

After receiving the IGMP report message, the R1 generates an IGMP entry according to the IGMP report message. The IGMP entry includes the IP address of the multicast group and the IP address of the H1. The R1 obtains a first BFER registration message according to the IP address of the multicast group and the IP address of the multicast source, where the first BFER registration message includes the IP address of the multicast group, the IP address of the multicast source, and an IP address of the R1. The R1 sends the first BFER registration message to the R2. The first BFER registration message may be a PIM join message, a BGP update message, or a LISP map-register message.

The R3 obtains, by means of static configuration or using the advertisement packet sent by the R2, the IP address of the R2, the address range of the multicast group supported by the R2, and the address range of the multicast source supported by the R2. After the R3 obtains a multicast packet from the S, where the multicast packet includes the IP address of the multicast group and the IP address of the multicast source, the R3 may determine, according to the IP address of the multicast group and the IP address of the multicast source, that a registration router that supports the multicast group and the multicast source is the R2. The R3 sends a multicast source registration packet to the R2 according to the obtained IP address of the R2. The multicast source registration packet includes the IP address of the multicast group, the IP address of the multicast source, and an IP address of the R3. The R3 may send the multicast source registration packet to the R2 using a unicast packet or a tunnel. The tunnel is a LISP tunnel, a GRE tunnel, a UDP tunnel, or the like. No examples are given herein for description.

After receiving the first BFER registration message, the R2 generates a first BFER entry according to the IP address of the R1, the IP address of the multicast group, and the IP address of the multicast source that are included in the first BFER registration message. The first BFER entry includes the IP address of the R1, the IP address of the multicast group, and the IP address of the multicast source. After receiving the multicast source registration packet from the R3, the R2 determines the first BFER entry according to the IP address of the multicast group and the IP address of the multicast source that are in the multicast source registration packet. The R2 obtains a first BFER list message according to the first BFER entry. The R2 sends the first BFER list message to the R3. The first BFER list message includes the IP address of the R1.

After receiving the first BFER list message from the R2, the R3 obtains the IP address of the R1. In the network scenario shown in FIG. 3B, the R3 may forward the multicast packet using a BIER technology. After receiving the multicast packet sent by the S, the R3 obtains the BIER multicast packet according to the IP address of the R1 and the multicast packet. A manner in which the R3 obtains the BIER multicast packet is the same as a manner in which the R2 obtains the BIER multicast packet in FIG. 3A, and details are not described herein again. The R3 sends the BIER multicast packet to the R4. A method in which the R4 forwards the BIER multicast packet is the same as a method used by the R4 in FIG. 3A, and details are not described herein again.

If the H2 sends a multicast group member packet to the R5, and the H2 and the H1 request to join the same multicast group, a manner in which the H2 sends the multicast group member packet to the R5 is the same as a manner in which the H1 sends the multicast group member packet to the R1, and details are not described herein again. A manner in which the R5 sends a second BFER registration message to the R2 is the same as a manner in which the R1 sends the first BFER registration message to the R2, and details are not described herein again. The second BFER registration message includes the IP address of the multicast group, the IP address of the multicast source, and an IP address of the R5. A difference is that, the R2 obtains a second BFER entry according to the second BFER registration message that is from the R5. The second BFER entry includes the IP address of the R5, the IP address of the multicast source, and the IP address of the multicast group. After receiving the multicast source registration message from the R3, the R2 obtains a second BFER list message. The R2 sends the second BFER list message to the R3, where the second BFER list message includes the IP of the R1 and the IP address of the R5. When generating the BIER multicast packet, the R3 may obtain, according to the IP address of the R1 and the IP address of the R5, a bit string including two bits that are set. One bit that is set corresponds to the R1, and the other bit that is set corresponds to the R5. The R3 sends, to the R4, the BIER multicast packet including the two bits that are set. The R4 sends the BIER multicast packet to the R5 and the R1 according to the two bits in the bit string that are set. A manner in which the R5 processes the BIER multicast packet is the same as a manner in which the R1 processes the BIER multicast packet, and details are not described herein again.

In the foregoing embodiment of the present disclosure, an R2 having a multicast registration capability may obtain a first BFER entry according to information about a multicast group that an R1 requests to join and an IP address of the R1. The information about the multicast group that the R1 requests to join is information about a multicast group carried in a first BFER registration message sent by the R1 to the R2. After receiving a multicast source registration message from an R3, the R2 sends the IP address of the R1 to the R3. The R3 may forward the multicast packet according to the IP address of the R1 using a BIER technology. In this way, a router in a conventional multicast network no longer needs to maintain multicast topology information, and the router in the conventional multicast network does not need to create a multicast topology before forwarding a multicast packet, thereby saving network resources, enabling a BIER network to perform interconnection and intercommunication with the conventional multicast network, and implementing rapid deployment of the BIER multicast network.

Figure 4A:
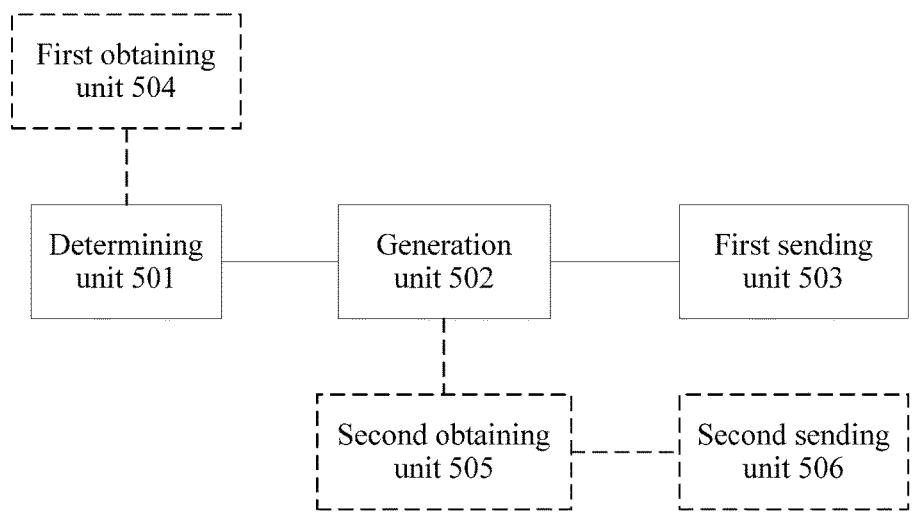
FIG. 4A is a schematic diagram of a BFER according to an embodiment of the present disclosure.

FIG. 4A is a schematic diagram of a BFER according to an embodiment of the present disclosure. The BFER provided in this embodiment of the present disclosure may execute the method in the embodiment corresponding to FIG. 1A. The BFER may be the BFER in the embodiment corresponding to FIG. 1B, FIG. 2A, or FIG. 2B, or may be the R1 or the R5 in FIG. 3A or FIG. 3B. The following describes, with reference to FIG. 4A, the BFER provided in this embodiment of the present disclosure.

The BFER provided in this embodiment of the present disclosure includes a determining unit 501, a generation unit 502, and a first sending unit 503. The determining unit 501 may be connected to the generation unit 502, and the generation unit 502 may be connected to the first sending unit 503.

The determining unit 501 is configured to determine, according to information that is about a multicast group in a multicast receiver list and that is obtained in advance, an IP address of a registration router that supports the multicast group, where the registration router has a capability of processing a multicast registration message. The information about the multicast group corresponds to the registration router. That is, information about a multicast group supported by the registration router includes the information about the multicast group.

For example, the determining unit 501 is further configured to determine, according to the information about the multicast group in the multicast receiver list and information about a multicast group supported by at least one registration router, the IP address of the registration router that supports the multicast group in the multicast receiver list. The at least one registration router may include the registration router that supports the multicast group.

The generation unit 502 is configured to generate a BFER registration message according to the information about the multicast group and the IP address, determined by the determining unit 501, of the registration router, where the BFER registration message is included in the multicast registration message, the BFER registration message includes the information about the multicast group, a destination IP address of the BFER registration message is the IP address of the registration router, and a source IP address of the BFER registration message is an IP address of the BFER.

For example, the BFER registration message is a PIM join message, a BGP update message, or a LISP map-register message.

The first sending unit 503 is configured to send the BFER registration message generated by the generation unit 502 to the registration router.

Optionally, the BFER further includes a first obtaining unit 504. The first obtaining unit 504 is configured to obtain information about at least one registration router by means of static configuration or by receiving an advertisement packet, where the advertisement packet is used to advertise that the at least one registration router has a capability of processing the multicast registration message, the advertisement packet includes the information about the at least one registration router, and the information about the at least one registration router includes an IP address of the at least one registration router and information about a multicast group supported by the at least one registration router. The determining unit 501 is further configured to determine, according to the information about the multicast group supported by the at least one registration router and the information, obtained by the first obtaining unit 504, about the multicast group in the multicast receiver list, the IP address of the registration router that supports the multicast group in the multicast receiver list.

Optionally, the BFER further includes a second obtaining unit 505 and a second sending unit 506. The second obtaining unit 505 is configured to obtain a BFER deregistration message after an entry included in the multicast receiver list is deleted, where the deleted entry includes information about a multicast group, and the BFER deregistration message includes the information about the multicast group in the deleted entry and the IP address of the BFER. The second sending unit 506 is configured to send the BFER deregistration message obtained by the second obtaining unit 505 to the registration router. The information about the multicast group included in the deleted entry may be information about a deleted multicast group.

For example, the second sending unit 506 sends the BFER deregistration message to the registration router in a unicast manner, where the BFER deregistration message is a PIM prune message or a BGP update message. Alternatively, the second sending unit 506 sends the BFER deregistration message to the registration router through a tunnel, where a destination IP address of the tunnel is the IP address of the registration router, and a source IP address of the tunnel is the IP address of the BFER. The BFER deregistration message may be the PIM prune message, and the PIM prune message may be sent to the registration router through the tunnel.

In the BFER provided in this embodiment of the present disclosure, a determining unit 501 may determine, according to information about a multicast group in a multicast receiver list and information about at least one registration router, an IP address of a registration router that supports the multicast group in the multicast receiver list. A generation unit 502 may generate a BFER registration message according to the information about the multicast group and the IP address of the registration router that supports the multicast group. The BFER registration message may include information about a multicast group that the multicast receiver intends to join and an IP address of the BFER. The registration router that receives the BFER registration message may obtain a BFER entry according to the information about the multicast group and the IP address of the BFER that are carried in the BFER registration message, where the BFER entry may help a BFIR generate a BIER multicast packet. Therefore, interconnection and intercommunication are implemented between a BIER network and a conventional multicast network.

Figure 4B:
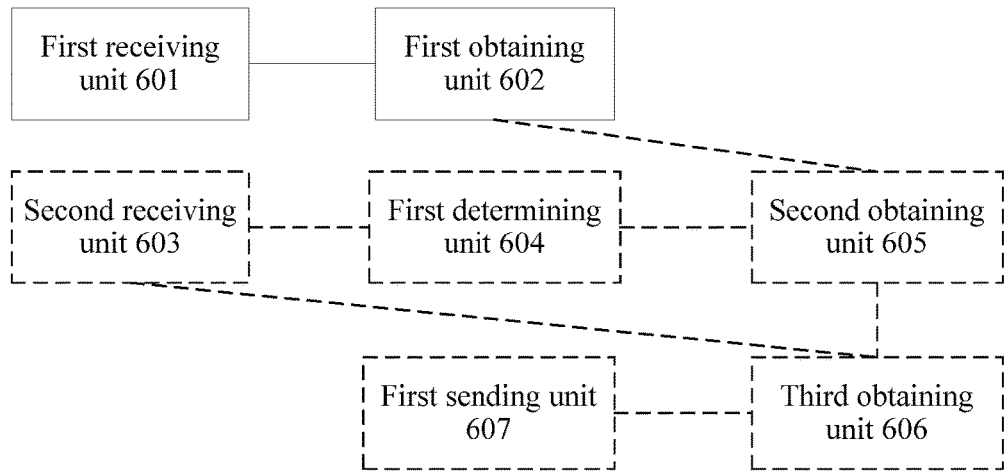
FIG. 4B is a schematic diagram of a registration router according to an embodiment of the present disclosure.

FIG. 4B is a schematic diagram of a registration router according to an embodiment of the present disclosure. The registration router provided in this embodiment of the present disclosure may execute the method in the embodiment corresponding to FIG. 1B, and may be the R2 in FIG. 3A.

The registration router in this embodiment of the present disclosure has a capability of processing a multicast registration message, and the registration router may also be used as a BFIR in a BIER network. The multicast registration message in this embodiment of the present disclosure may include a BFER registration message. The following describes, with reference to FIG. 4B, the registration router provided in this embodiment of the present disclosure.

The registration router provided in this embodiment of the present disclosure includes a first receiving unit 601 and a first obtaining unit 602. The first receiving unit 601 is connected to the first obtaining unit 602.

The first receiving unit 601 is configured to receive a BFER registration message sent by a BFER. The multicast registration message includes the BFER registration message, the BFER registration message includes information about a multicast group, a destination IP address of the BFER registration message is an IP address of the registration router, and a source IP address of the BFER registration message is an IP address of the BFER.

The first obtaining unit 602 is configured to obtain a BFER entry according to the BFER registration message, where the BFER entry includes the information about the multicast group and the IP address of the BFER, and the IP address of the BFER corresponds to the information about the multicast group.

Optionally, the registration router further includes a second receiving unit 603, a first determining unit 604, a second obtaining unit 605, a third obtaining unit 606, and a first sending unit 607.

The second receiving unit 603 is configured to receive a multicast packet sent by a router connected to a multicast source, where the multicast packet includes the information about the multicast group. The first determining unit 604 is configured to determine, according to the information about the multicast group included in the multicast packet, the BFER entry corresponding to the information about the multicast group. The second obtaining unit 605 is configured to obtain the IP address of the BFER according to the BFER entry. The third obtaining unit 606 is configured to obtain a BIER multicast packet according to the IP address of the BFER and the multicast packet, where the BIER multicast packet includes a BIER header and the multicast packet, the BIER header includes a bit string, and a bit, in the bit string, corresponding to the BFER is set. The first sending unit 607 is configured to send the BIER multicast packet to the BFER.

Optionally, the registration router further includes a sending unit configured to send an advertisement packet in the BIER network, where the advertisement packet is used to advertise that the registration router has a capability of processing the multicast registration message, and the advertisement packet includes the IP address of the registration router and information about a multicast group supported by the registration router. The multicast registration message may include the BFER registration message.

For example, the advertisement packet is an OSPF router information opaque LSA, the OSPF router information opaque LSA includes a TLV, and the TLV is used to carry the information about the multicast group and an identifier indicating that the registration router has the capability of processing the multicast registration message. Alternatively, the advertisement packet is a packet including an IS-IS router capability TLV, the IS-IS router capability TLV includes a sub-TLV, and the sub-TLV is used to carry the information about the multicast group and an identifier indicating that the registration router has the capability of processing the multicast registration message.

Optionally, the registration router further includes a fifth receiving unit, a third determining unit, and a deletion unit. The fifth receiving unit is connected to the third determining unit, and the third determining unit is connected to the deletion unit.

For example, the fifth receiving unit is configured to receive a BFER deregistration message sent by the BFER, where the BFER deregistration message includes the IP address of the BFER and information about a deleted multicast group. The third determining unit is configured to determine a to-be-deleted BFER entry according to the information about the deleted multicast group and the IP address of the BFER, where the to-be-deleted BFER entry includes the IP address of the BFER and the information about the deleted multicast group. The deletion unit is configured to delete the to-be-deleted BFER entry determined by the third determining unit.

The registration router in this embodiment of the present disclosure may be used as a BFIR in a BIER network. After the first receiving unit 601 of the registration router receives a BFER registration packet sent by a BFER, the first obtaining unit 602 obtains a BFER entry according to an IP address of the BFER and information about a multicast group that are in the BFER registration packet. Once the second receiving unit 603 of the registration router receives a multicast packet corresponding to the information about the multicast group, the third obtaining unit 606 of the registration router may obtain a BIER multicast packet according to the BFER entry and the multicast group packet. The registration router sends the BIER multicast packet to the BFER in order to help implement rapid deployment of a BIER technology in a conventional multicast network, and implement interconnection and intercommunication between a BIER network and the conventional multicast network.

Figure 5A:
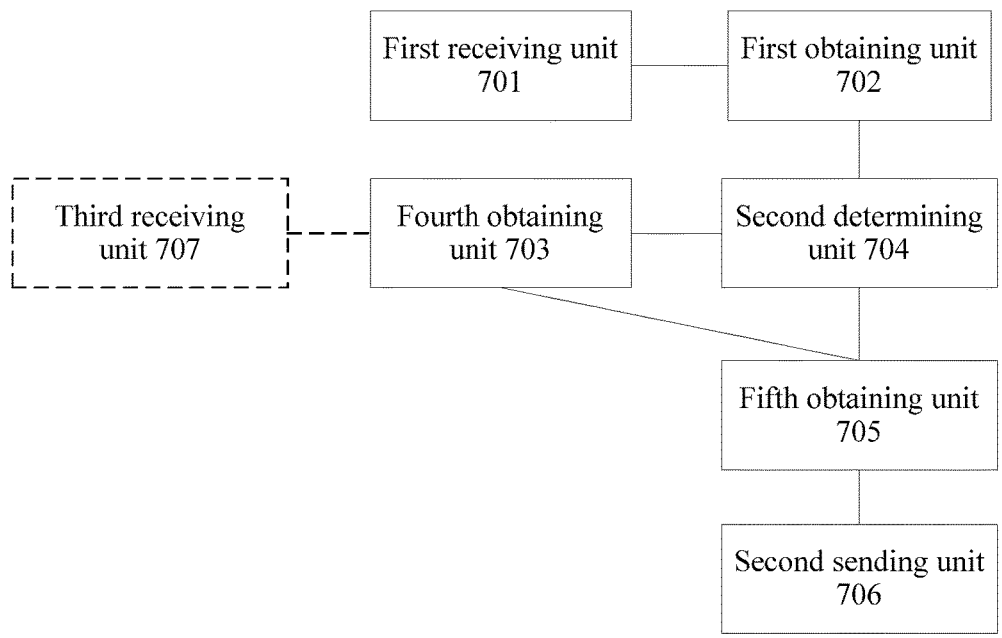
FIG. 5A is a schematic diagram of another registration router according to an embodiment of the present disclosure.

FIG. 5A is a schematic diagram of another registration router according to an embodiment of the present disclosure. The registration router provided in this embodiment of the present disclosure may execute the method in the embodiment corresponding to FIG. 2A, and may be the R2 in FIG. 3B. The registration router in this embodiment of the present disclosure has a capability of processing a multicast registration message, and the registration router may not be used as a BFIR in a BIER network. The multicast registration message in this embodiment of the present disclosure may include a BFER registration message and a multicast source registration message. The following describes, with reference to FIG. 5A, the registration router provided in this embodiment of the present disclosure.

The registration router provided in this embodiment of the present disclosure includes a first receiving unit 701, a first obtaining unit 702, a fourth obtaining unit 703, a second determining unit 704, a fifth obtaining unit 705, and a second sending unit 706. The first receiving unit 701 may be connected to the first obtaining unit 702.

The first receiving unit 701 is configured to receive a BFER registration message sent by a BFER. The multicast registration message includes the BFER registration message, the BFER registration message includes information about a multicast group, a destination IP address of the BFER registration message is an IP address of the registration router, and a source IP address of the BFER registration message is an IP address of the BFER.

The first obtaining unit 702 is configured to obtain a BFER entry according to the BFER registration message, where the BFER entry includes the information about the multicast group and the IP address of the BFER, and the IP address of the BFER corresponds to the information about the multicast group.

The fourth obtaining unit 703 is configured to obtain, from a router connected to a multicast source, the information about the multicast group and an IP address of the router connected to the multicast source.

The second determining unit 704 is configured to determine, according to the information about the multicast group obtained by the fourth obtaining unit 703, the BFER entry corresponding to the multicast group.

The fifth obtaining unit 705 is configured to obtain a BFER list message according to the BFER entry obtained by the second determining unit 704 and the IP address, obtained by the fourth obtaining unit 703, of the router connected to the multicast source, where the BFER list message includes the IP address of the BFER corresponding to the multicast group, and a destination IP address of the BFER list message is the IP address of the router connected to the multicast source.

The second sending unit 706 is configured to send the BFER list message to the router connected to the multicast source.

Optionally, the registration router further includes a third receiving unit 707. The third receiving unit 707 is configured to receive an encapsulated packet that is sent through a tunnel by the router connected to the multicast source, where the encapsulated packet includes a packet header and a multicast packet that is sent by the multicast source to the router connected to the multicast source, a source IP address of the tunnel in the packet header is the IP address of the router connected to the multicast source, and the multicast packet includes the information about the multicast group. The fourth obtaining unit 703 is further configured to obtain, from the multicast packet, the information about the multicast group, and obtain, from the source IP address of the tunnel, the IP address of the router connected to the multicast source.

Optionally, the registration router further includes a fourth receiving unit (not shown). The fourth receiving unit is configured to receive a multicast source registration message sent by the router connected to the multicast source, where the multicast source registration message includes the information about the multicast group and the IP address of the router connected to the multicast source. The fourth obtaining unit 703 is further configured to obtain, from the multicast source registration message, the information about the multicast group and the IP address of the router connected to the multicast source.

Optionally, the registration router may further include a third sending unit (not shown). The third sending unit is configured to send an advertisement packet in the BIER network, where the advertisement packet is used to advertise that the registration router has a capability of processing the multicast registration message, and the advertisement packet includes the IP address of the registration router and the information about the multicast group. A sending manner of the advertisement packet is the same as a sending manner of the advertisement packet in FIG. 2B, and details are not described herein again. If the registration router cannot process the multicast source registration message, the capability of processing the multicast registration message is a capability of processing the BFER registration message. If the registration router can process the multicast source registration message, the capability of processing the multicast registration message includes a capability of processing the BFER registration message and a capability of processing the multicast source registration message.

For example, the advertisement packet is an OSPF router information opaque LSA, the OSPF router information opaque LSA includes a TLV, and the TLV is used to carry the information about the multicast group and an identifier indicating that the registration router has the capability of processing the multicast registration message. Alternatively, the advertisement packet is a packet including an IS-IS router capability TLV, the IS-IS router capability TLV includes a sub-TLV, and the sub-TLV is used to carry the information about the multicast group and an identifier indicating that the registration router has the capability of processing the multicast registration message.

Optionally, the registration router further includes a fifth receiving unit (not shown), a third determining unit (not shown), and a deletion unit (not shown). The fifth receiving unit is connected to the third determining unit, and the third determining unit is connected to the deletion unit.

For example, the fifth receiving unit is configured to receive a BFER deregistration message sent by the BFER, where the BFER deregistration message includes the IP address of the BFER and information about a deleted multicast group. The third determining unit is configured to determine a to-be-deleted BFER entry according to the information about the deleted multicast group and the IP address of the BFER. The deletion unit is configured to delete the to-be-deleted BFER entry determined by the third determining unit.

According to the registration router in this embodiment of the present disclosure, after the first receiving unit 701 receives a BFER registration packet sent by a BFER, the first obtaining unit 702 obtains a BFER entry according to an IP address of the BFER and information about a multicast group that are in the BFER registration packet. After the fourth obtaining unit 703 obtains, from the router connected to the multicast source, the information about the multicast group and an IP address of a router connected to a multicast source, the second determining unit 704 may determine the BFER entry corresponding to the multicast group, the fifth obtaining unit 705 may obtain a BFER list message according to the BFER entry, and the second sending unit 706 may send, using the BFER list message, the IP address of the BFER to a router used as a BFIR. In this way, the router used as a BFIR obtains a BIER multicast packet according to a received multicast packet corresponding to the information about the multicast group in order to help implement rapid deployment of a BIER technology in a conventional multicast network, and implement interconnection and intercommunication between a BIER network and the conventional multicast network.

Figure 5B:
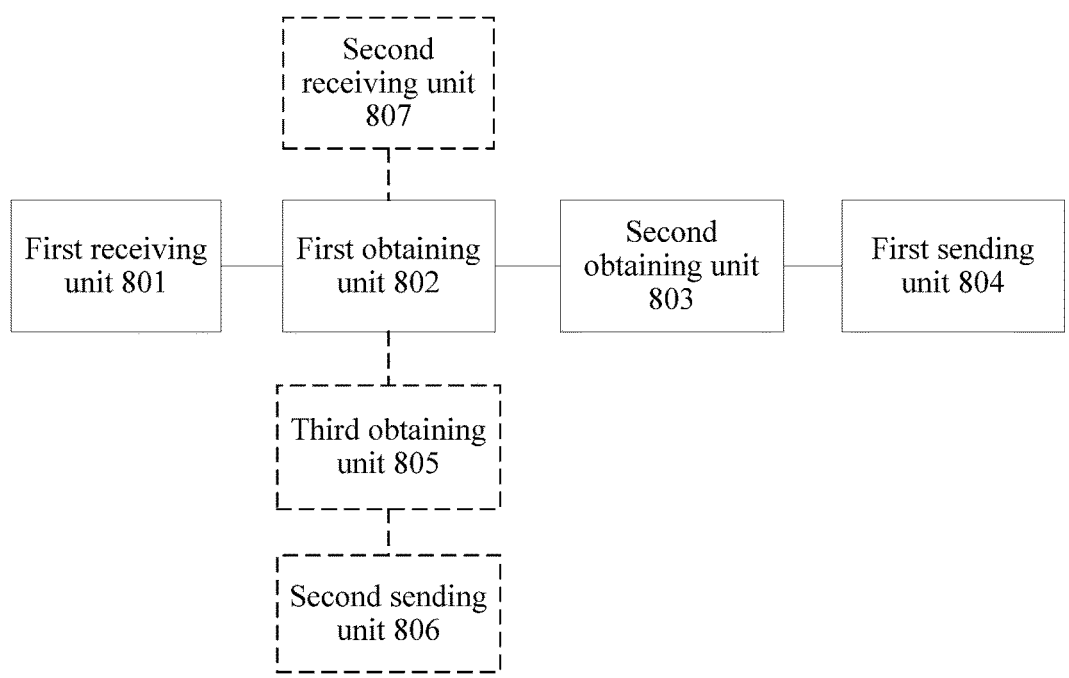
FIG. 5B is a schematic diagram of a BFIR according to an embodiment of the present disclosure.

FIG. 5B is a schematic diagram of a BFIR according to an embodiment of the present disclosure. The BFIR in this embodiment of the present disclosure may be the BFIR in the embodiment corresponding to FIG. 2A or FIG. 2B, or may be the R3 in FIG. 3B. The BFIR may be a router connected to a multicast source. If the multicast registration message includes a BFER registration message, the BFIR may send a multicast packet to a registration router to implement multicast source registration. If the multicast registration message includes the BFER registration message and a multicast source registration message, the BFIR may send the multicast packet or the multicast source registration message to the registration router, to implement multicast source registration. The following describes, with reference to FIG. 5B, the BFIR provided in this embodiment of the present disclosure.

The BFIR provided in this embodiment of the present disclosure includes a first receiving unit 801, a first obtaining unit 802, a second obtaining unit 803, and a first sending unit 804.

The first receiving unit 801 is configured to receive a multicast packet from a multicast source, where the multicast packet includes information about a multicast group, and the BFIR is connected to the multicast source.

The first obtaining unit 802 is configured to obtain, from a registration router, an IP address of a BFER corresponding to the multicast group, where the registration router has a capability of processing a multicast registration message. The BFER corresponding to the multicast group is a BFER that requests to join the multicast group.

The second obtaining unit 803 is configured to obtain a BIER multicast packet according to the multicast packet and the IP address of the BFER, where the BIER multicast packet includes a BIER header and the multicast packet, the BIER header includes a bit string, and a bit, in the bit string, corresponding to the BFER is set.

The first sending unit 804 is configured to send the BIER multicast packet to the BFER.

Optionally, the BFIR further includes a third obtaining unit 805. The third obtaining unit 805 is configured to obtain information about at least one registration router by means of static configuration or by receiving an advertisement packet, where the advertisement packet is used to advertise that the at least one registration router has a capability of processing the multicast registration message, the advertisement packet includes the information about the at least one registration router, and the information about the at least one registration router includes an IP address of the at least one registration router and information about a multicast group supported by the at least one registration router. A format of the advertisement packet may be the same as that of the advertisement packet in the embodiment corresponding to FIG. 2B, and details are not described herein again. The information about the at least one registration router includes a registration router that supports the multicast group.

Optionally, the BFIR further includes a second sending unit 806 and a second receiving unit 807.

The second sending unit 806 is configured to send a multicast source registration message to the registration router according to an IP address of the registration router, where the multicast source registration message includes the information about the multicast group and an IP address of the BFIR, and the multicast registration message includes the multicast source registration message. The IP address of the registration router may be an IP address, obtained by the third obtaining unit 805, of the registration router that supports the multicast group. The second receiving unit 807 is configured to receive a BFER list message sent by the registration router, where the BFER list message includes the IP address of the BFER, a destination IP address of the BFER list message is the IP address of the BFIR, and a source IP address of the BFER list message is the IP address of the registration router. The first obtaining unit 802 is further configured to obtain the IP address of the BFER from the BFER list message received by the second receiving unit 807.

In the BFIR provided in this embodiment of the present disclosure, the first obtaining unit 802 may obtain an IP address of a BFER from a registration router. In this way, the second obtaining unit 803 may obtain a BIER multicast packet according to a multicast packet from a multicast source and the IP address of the BFER in order to help implement rapid deployment of a BIER technology in a conventional multicast network, and implement interconnection and intercommunication between a BIER network and the conventional multicast network.

Figure 6A:
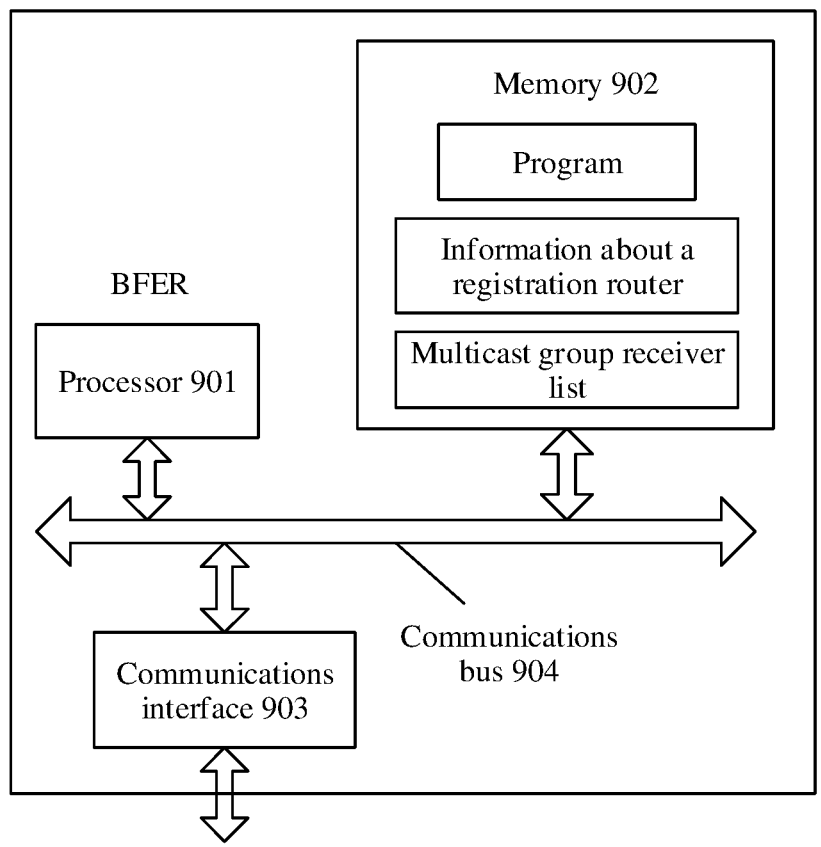
FIG. 6A is a schematic structural diagram of a BFER according to an embodiment of the present disclosure.

FIG. 6A is a schematic structural diagram of a BFER according to an embodiment of the present disclosure. The BFER shown in FIG. 6A may include a processor 901, a memory 902, and a communications interface 903. The processor 901, the memory 902, and the communications interface 903 may be connected using a communications bus 904. The processor 901 includes at least one physical processor, and the communications interface 903 includes at least one physical interface including a transmitter. The memory 902 is configured to store a program, a multicast group receiver list, and information about a registration router.

The BFER shown in FIG. 6A and the BFER shown in FIG. 4A may be a same BFER in a BIER network. For example, both the BFER shown in FIG. 6A and the BFER shown in FIG. 4A are the R1 or the R5 in FIG. 3A, or the R1 or the R5 in FIG. 3B. FIG. 4A displays content included in the BFER from a logical perspective, and FIG. 6A displays content included in the BFER from a physical perspective. The first sending unit 503 in FIG. 4A may be implemented by the communications interface 903 in FIG. 6A, and the determining unit 501 and the generation unit 502 in FIG. 4A may be implemented by the processor 901 in FIG. 6A. Optionally, the first obtaining unit 504 and/or the second obtaining unit 505 in FIG. 4A may be implemented by the processor 901 in FIG. 6A, and the second sending unit 506 in FIG. 4A may be implemented by the communications interface 903 in FIG. 6A.

The processor 901 executes the following operations according to an executable instruction included in the program read from the memory 902.

The processor 901 determines, according to information that is about a multicast group in a multicast receiver list and that is obtained in advance, an IP address of a registration router that supports the multicast group, where the registration router has a capability of processing a multicast registration message, and the processor 901 generates a BFER registration message according to the information about the multicast group and the IP address of the registration router, where the BFER registration message is included in the multicast registration message, the BFER registration message includes the information about the multicast group, a destination IP address of the BFER registration message is the IP address of the registration router, and a source IP address of the BFER registration message is an IP address of the BFER, and the processor 901 sends the BFER registration message to the registration router using the communications interface 903.

Optionally, the processor 901 may further obtain information about at least one registration router by means of static configuration. Alternatively, the processor 901 may obtain the information about the at least one registration router using an advertisement packet that is received using the communications interface 903, where the advertisement packet is used to advertise that the at least one registration router has a capability of processing the multicast registration message, the advertisement packet includes the information about the at least one registration router, and the information about the at least one registration router includes an IP address of the at least one registration router and information about a multicast group supported by the at least one registration router. Correspondingly, the processor 901 may determine, according to the information about the multicast group in the multicast receiver list stored by the memory 902 and the information about the multicast group supported by the at least one registration router, the IP address of the registration router that supports the multicast group.

For example, the BFER registration message is a PIM join message, a BGP update message, or a LISP map-register message.

Optionally, the processor 901 further obtains a BFER deregistration message after an entry included in the multicast receiver list stored by the memory 902 is deleted, where the deleted entry includes information about a multicast group, and the BFER deregistration message includes the information about the multicast group in the deleted entry and the IP address of the BFER, and the processor 901 further sends the BFER deregistration message to the registration router using the communications interface 903.

In the BFER provided in this embodiment of the present disclosure, the processor 901 may determine, according to information about a multicast group in a multicast receiver list and information about at least one registration router, an IP address of a registration router that supports the multicast group. The processor 901 may generate a BFER registration message according to the information about the multicast group and the IP address of the registration router. The BFER registration message may include information about a multicast group that the multicast receiver intends to join and an IP address of the BFER. The registration router that receives the BFER registration message may obtain a BFER entry according to the information about the multicast group and the IP address of the BFER that are carried in the BFER registration message, where the BFER entry may help a BFIR generate a BIER multicast packet. Therefore, interconnection and intercommunication are implemented between a BIER network and a conventional multicast network.

Figure 6B:
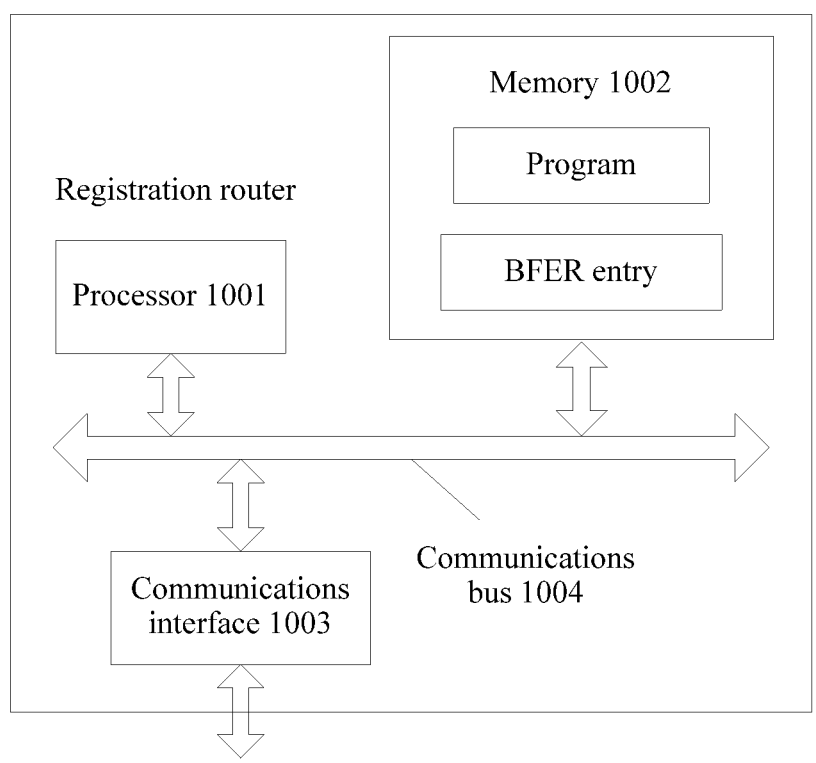
FIG. 6B is a schematic structural diagram of a registration router according to an embodiment of the present disclosure.

FIG. 6B is a schematic structural diagram of a registration router according to an embodiment of the present disclosure. The registration router shown in FIG. 6B may include a processor 1001, a memory 1002, and a communications interface 1003. The processor 1001, the memory 1002, and the communications interface 1003 may be connected using a communications bus 1004. The processor 1001 includes at least one physical processor, and the communications interface 1003 includes at least one physical interface including a receiver and a transmitter. The memory 1002 is configured to store a program and a BFER entry.

The registration router shown in FIG. 6B and the registration router shown in FIG. 4B may be a same registration router in a BIER network. For example, both the registration router shown in FIG. 6B and the registration router shown in FIG. 4B are the R2 in FIG. 3A. Alternatively, the registration router shown in FIG. 6B and the registration router shown in FIG. 5A may be a same registration router in a BIER network. For example, both the registration router shown in FIG. 6B and the registration router shown in FIG. 5A are the R2 in FIG. 3B. FIG. 4B or FIG. 5A displays content included in the registration router from a logical perspective, and FIG. 6B displays content included in the registration router from a physical perspective.

The processor 1001 executes the following operations according to an executable instruction included in the program read from the memory 1002.

The processor 1001 may receive, using the communications interface 1003, a BFER registration message sent by a BFER, where the registration router has a capability of processing a multicast registration message, the multicast registration message includes the BFER registration message, the BFER registration message includes information about a multicast group, a destination IP address of the BFER registration message is an IP address of the registration router, and a source IP address of the BFER registration message is an IP address of the BFER.

The processor 1001 obtains a BFER entry according to the BFER registration message, where the BFER entry includes the information about the multicast group and the IP address of the BFER, and the IP address of the BFER corresponds to the information about the multicast group. The processor 1001 may write the BFER entry to the memory 1002.

Optionally, the processor 1001 may further receive, using the communications interface 1003, a multicast packet sent by a router connected to a multicast source, where the multicast packet includes the information about the multicast group, the processor 1001 may further determine the BFER entry according to the information about the multicast group included in the multicast packet. The processor 1001 may further obtain the IP address of the BFER according to the BFER entry. The processor 1001 may further obtain a BIER multicast packet according to the IP address of the BFER and the multicast packet, where the BIER multicast packet includes a BIER header and the multicast packet, the BIER header includes a bit string, and a bit, in the bit string, corresponding to the BFER is set, and the processor 1001 may further send the BIER multicast packet to the BFER using the communications interface 1003.

Optionally, the processor 1001 may obtain, using the communications interface 1003 from a router connected to a multicast source, the information about the multicast group and an IP address of the router connected to the multicast source. The processor 1001 may further obtain, from the memory 1002 according to the information about the multicast group, the BFER entry corresponding to the multicast group. The processor 1001 may further obtain a BFER list message according to the BFER entry corresponding to the multicast group and the IP address of the router connected to the multicast source, where the BFER list message includes the IP address of the BFER corresponding to the multicast group, and a destination IP address of the BFER list message is the IP address of the router connected to the multicast source, and the processor 1001 may further send, using the communications interface 1003, the BFER list message to the router connected to the multicast source.

Optionally, the processor 1001 may send an advertisement packet in the BIER network using the communications interface 1003, where the advertisement packet is used to advertise that the registration router has a capability of processing the multicast registration message, and the advertisement packet includes the IP address of the registration router and the information about the multicast group. The multicast registration message includes the BFER registration message, or the multicast registration message includes the BFER registration message and the multicast source registration message.

Optionally, the processor 1001 may receive, using the communications interface 1003, a BFER deregistration message sent by the BFER, where the BFER deregistration message includes the IP address of the BFER and information about a deleted multicast group. The processor 1001 may further determine a to-be-deleted BFER entry in the memory 1002 according to the information about the deleted multicast group and the IP address of the BFER, and the processor 1001 may further delete the to-be-deleted BFER entry in the memory 1002.

In the registration router provided in this embodiment of the present disclosure, the processor 1001 may obtain a BFER entry according to a received BFER registration packet sent by a BFER. The processor 1001 may send an IP address of the BFER in the BFER entry to a router used as a BFIR. In this way, the router used as a BFIR may obtain and forward a BIER multicast packet according to the IP address of the BFER in order to help implement rapid deployment of a BIER technology in a conventional multicast network, and implement interconnection and intercommunication between a BIER network and the conventional multicast network.

Figure 6C:
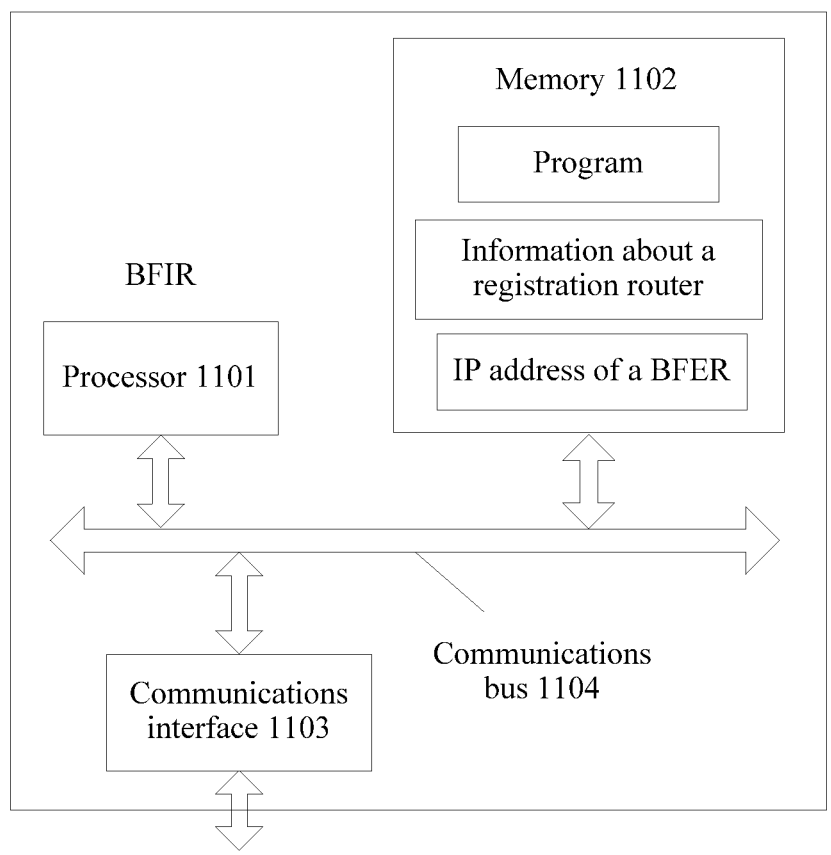
FIG. 6C is a schematic structural diagram of a BFIR according to an embodiment of the present disclosure.

FIG. 6C is a schematic structural diagram of a BFIR according to an embodiment of the present disclosure. The BFIR shown in FIG. 6C may include a processor 1101, a memory 1102, and a communications interface 1103. The processor 1101, the memory 1102, and the communications interface 1103 may be connected using a communications bus 1104. The processor 1101 includes at least one physical processor, and the communications interface 1103 includes at least one physical interface including a transmitter and a receiver. The memory 1102 is configured to store a program, an IP address of a BFER, and information about a registration router.

The BFIR shown in FIG. 6C and the BFIR shown in FIG. 5B may be a same BFIR in a BIER network. For example, both the BFIR shown in FIG. 6C and the BFIR shown in FIG. 5B are the R3 in FIG. 3B. FIG. 5B displays content included in the BFIR from a logical perspective, and FIG. 6C displays content included in the BFIR from a physical perspective. The first receiving unit 801 and the first sending unit 804 in FIG. 5B may be implemented by the communications interface 1103 in FIG. 6C, and the first obtaining unit 802 and the second obtaining unit 803 in FIG. 5B may be implemented by the processor 1101 in FIG. 6C. Optionally, the third obtaining unit 805 in FIG. 5B may be implemented by the processor 1101 and/or the communications interface 1103 in FIG. 6C. Optionally, the second sending unit 806 and the second receiving unit 807 in FIG. 5B may be implemented by the communications interface 1103 in FIG. 6C.

The processor 1101 executes the following operations according to an executable instruction included in the program read from the memory 1102.

The processor 1101 receives a multicast packet from a multicast source using the communications interface 1103, where the multicast packet includes information about a multicast group, and the BFIR is connected to the multicast source.

The processor 1101 obtains, from the registration router using the communications interface 1103, the IP address of the BFER corresponding to the multicast group, where the registration router has a capability of processing a multicast registration message.

The processor 1101 obtains a BIER multicast packet according to the multicast packet and the IP address of the BFER, where the BIER multicast packet includes a BIER header and the multicast packet, the BIER header includes a bit string, and a bit, in the bit string, corresponding to the BFER is set.

The processor 1101 sends the BIER multicast packet to the BFER using the communications interface 1103.

Optionally, the processor 1101 may further obtain information about at least one registration router by means of static configuration. Alternatively, the processor 1101 may further obtain the information about the at least one registration router using an advertisement packet that is received using the communications interface 1103, where the advertisement packet is used to advertise that the at least one registration router has a capability of processing the multicast registration message, the advertisement packet includes the information about the at least one registration router, and the information about the at least one registration router includes an IP address of the at least one registration router and information about a multicast group supported by the at least one registration router.

Optionally, the processor 1101 may further send a multicast source registration message to the registration router according to the IP address of the registration router using the communications interface 1103, where the multicast source registration message includes the information about the multicast group and an IP address of the BFIR, and the multicast registration message includes the multicast source registration message, the processor 1101 may further receive, using the communications interface 1103, a BFER list message sent by the registration router, where the BFER list message includes the IP address of the BFER, a destination IP address of the BFER list message is the IP address of the BFIR, and a source IP address of the BFER list message is the IP address of the registration router, and the processor 1101 may further obtain the IP address of the BFER from the BFER list message.

In the BFIR provided in this embodiment of the present disclosure, the processor 1101 may obtain an IP address of a BFER from a registration router using a communications interface. In this way, the processor 1101 may obtain a BIER multicast packet according to a multicast packet from a multicast source and the IP address of the BFER in order to help implement rapid deployment of a BIER technology in a conventional multicast network, and implement interconnection and intercommunication between a BIER network and the conventional multicast network.

The foregoing processor 901, 1001, and 1101 may be a microprocessor, or the processor 901, 1001, and 1101 may be any conventional processor. The steps of the methods disclosed with reference to the embodiments of the present disclosure may be directly performed by a hardware processor, or may be performed using a combination of hardware in the processor 901, 1001, and 1101 and a software module. When it is implemented using software, code used to implement the foregoing functions may be stored in a computer-readable medium, where the computer-readable medium includes a computer storage medium. The storage medium may be any available medium accessible to a computer. The following is used as an example but is not construed as a limitation. The computer readable medium may be a random access memory (RAM), a read-only memory (ROM), an electrically erasable programmable ROM (EEPROM), a compact disk ROM (CD-ROM) or other optical disc storage, a disk storage medium or other disk storage device, or any other medium that can be used to carry or store program code in an instruction or data structure form and that can be accessed by a computer. The computer-readable medium may be a compact disc (CD), a laser disc, a digital video disc (DVD), a floppy disk, or a BLU-RAY DISC.

Finally, it should be noted that the foregoing embodiments are merely intended for describing examples of the technical solutions of the present disclosure other than limiting the present disclosure. Although the present disclosure and benefits of the present disclosure are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of the present disclosure.

What is claimed is:

1. A multicast forwarding method, applied to a bit index explicit replication (BIER) network, comprising:
   determining, by a bit-forwarding egress router (BFER) according to information about a multicast group in a multicast receiver list obtained in advance, an Internet Protocol (IP) address of a registration router that supports the multicast group, wherein the registration router is configured to process a multicast registration message;
   generating, by the BFER, a BFER registration message according to the information about the multicast group and the IP address of the registration router, wherein the BFER registration message is part of the multicast registration message, wherein the BFER registration message comprises the information about the multicast group, wherein a destination IP address of the BFER registration message is the IP address of the registration router, and wherein a source IP address of the BFER registration message is an IP address of the BFER;
   sending, by the BFER, the BFER registration message to the registration router;
   obtaining, by the BFER, a BFER deregistration message after an entry that is part of the multicast receiver list is deleted, wherein the deleted entry comprises information about a multicast group, and wherein the BFER deregistration message comprises the information about the multicast group in the deleted entry and the IP address of the BFER; and
   sending, by the BFER, the BFER deregistration message to the registration router.

2. The multicast forwarding method of claim 1, further comprising obtaining, by the BFER, information about at least one registration router by static configuration, wherein the information about the at least one registration router comprises an IP address of the at least one registration router and information about a multicast group supported by the at least one registration router, wherein the advertisement packet advertises that the at least one registration router is configured to process the multicast registration message, wherein the advertisement packet comprises the information about the at least one registration router, and wherein determining the IP address of the registration router that supports the multicast group comprises determining, by the BFER according to the information about the multicast group in the multicast receiver list and the information about the multicast group supported by the at least one registration router, the IP address of the registration router that supports the multicast group in the multicast receiver list.

3. A multicast forwarding method, applied to a bit index explicit replication (BIER) network, comprising:
   receiving, by a registration router, a bit-forwarding egress router (BFER) registration message from a BFER, wherein the registration router is configured to process a multicast registration message, wherein the multicast registration message comprises the BFER registration message, wherein the BFER registration message comprises information about a multicast group, wherein a destination Internet Protocol (IP) address of the BFER registration message is an IP address of the registration router, and wherein a source IP address of the BFER registration message is an IP address of the BFER;
   obtaining, by the registration router, a BFER entry according to the BFER registration message, wherein the BFER entry comprises the information about the multicast group and the IP address of the BFER, and wherein the IP address of the BFER corresponds to the information about the multicast group;

sending, by the registration router, an advertisement packet in the BIER network, wherein the advertisement packet advertises that the registration router is configured to process the multicast registration message, and wherein the advertisement packet comprises the IP address of the registration router and the information about the multicast group;

receiving, by the registration router, a BFER deregistration message from the BFER, wherein the BFER deregistration message comprises the IP address of the BFER and information about a deleted multicast group;

determining, by the registration router, a to-be-deleted BFER entry according to the information about the multicast group and the IP address of the BFER, wherein the to-be-deleted BFER entry comprises the IP address of the BFER and the information about the deleted multicast group; and deleting, by the registration router, the to-be-deleted BFER entry.

4. The multicast forwarding method of claim 3, further comprising:

receiving, by the registration router, a multicast packet from a router coupled to a multicast source, wherein the multicast packet comprises the information about the multicast group;

determining, by the registration router, the BFER entry according to the information about the multicast group that is part of the multicast packet;

obtaining, by the registration router, the IP address of the BFER according to the BFER entry;

obtaining, by the registration router, a BIER multicast packet according to the IP address of the BFER and the multicast packet, wherein the BIER multicast packet comprises a BIER header and the multicast packet, wherein the BIER header comprises a bit string, and wherein a bit, in the bit string, corresponding to the BFER is set; and sending, by the registration router, the BIER multicast packet to the BFER.

5. The multicast forwarding method of claim 3, further comprising:

obtaining, by the registration router from a router coupled to a multicast source, the information about the multicast group and an IP address of the router coupled to the multicast source;

determining, by the registration router according to the information about the multicast group, the BFER entry corresponding to the multicast group;

obtaining, by the registration router, a BFER list message according to the BFER entry corresponding to the multicast group and the IP address of the router coupled to the multicast source, wherein the BFER list message comprises the IP address of the BFER corresponding to the multicast group, and wherein a destination IP address of the BFER list message is the IP address of the router coupled to the multicast source; and sending, by the registration router, the BFER list message to the router coupled to the multicast source, and wherein obtaining the information about the multicast group and the IP address of the router coupled to the multicast source comprises:

receiving, by the registration router, an encapsulated packet sent through a tunnel by the router coupled to the multicast source, wherein the encapsulated packet comprises a packet header and a multicast packet from the multicast source to the router coupled to the multicast source, wherein a source IP address of the tunnel in the packet header is the IP address of the router coupled to the multicast source, and wherein the multicast packet comprises the information about the multicast group;

obtaining, by the registration router from the multicast packet, the information about the multicast group; and obtaining, by the registration router from the packet header, the IP address of the router coupled to the multicast source.

6. The multicast forwarding method of claim 3, further comprising:

obtaining, by the registration router from a router coupled to a multicast source, the information about the multicast group and an IP address of the router coupled to the multicast source;

determining, by the registration router according to the information about the multicast group, the BFER entry corresponding to the multicast group;

obtaining, by the registration router, a BFER list message according to the BFER entry corresponding to the multicast group and the IP address of the router coupled to the multicast source, wherein the BFER list message comprises the IP address of the BFER corresponding to the multicast group, and wherein a destination IP address of the BFER list message is the IP address of the router coupled to the multicast source; and sending, by the registration router, the BFER list message to the router coupled to the multicast source, and wherein obtaining the information about the multicast group and the IP address of the router coupled to the multicast source comprises:

receiving, by the registration router, a multicast source registration message from the router coupled to the multicast source, wherein the multicast source registration message comprises the information about the multicast group and the IP address of the router coupled to the multicast source; and obtaining, by the registration router from the multicast source registration message, the information about the multicast group and the IP address of the router coupled to the multicast source.

7. A multicast forwarding method, applied to a bit index explicit replication (BIER) network, comprising:

receiving, by a bit-forwarding ingress router (BFIR), a multicast packet from a multicast source, wherein the multicast packet comprises information about a multicast group, and wherein the BFIR is coupled to the multicast source;

obtaining, by the BFIR from a registration router, an Internet Protocol (IP) address of a bit-forwarding egress router (BFER) corresponding to the multicast group, wherein the registration router is configured to process a multicast registration message;

obtaining, by the BFIR, a BIER multicast packet according to the multicast packet and the IP address of the BFER, wherein the BIER multicast packet comprises a BIER header and the multicast packet, wherein the BIER header comprises a bit string, and wherein a bit, in the bit string, corresponding to the BFER is set;

sending, by the BFIR, the BIER multicast packet to the BFER; and obtaining, by the BFIR, information about at least one registration router by receiving an advertisement packet, wherein the advertisement packet advertises that the at least one registration router is configured to process the multicast registration message, wherein the advertisement packet comprises the information about the at least one registration router, and wherein the information about the at least one registration router comprises an IP address of the at least one registration router and information about a multicast group supported by the at least one registration router, and wherein obtaining the IP address of the BFER corresponding to the multicast group comprises:

sending, by the BFIR, a multicast source registration message to the registration router according to an IP address of the registration router, wherein the multicast source registration message comprises the information about the multicast group and an IP address of the BFIR, and wherein the multicast registration message comprises the multicast source registration message;

receiving, by the BFIR, a BFER list message from the registration router, wherein the BFER list message comprises the IP address of the BFER, wherein a destination IP address of the BFER list message is the IP address of the BFIR, and wherein a source IP address of the BFER list message is the IP address of the registration router; and obtaining, by the BFIR, the IP address of the BFER from the BFER list message.

8. A bit-forwarding egress router (BFER), wherein the BFER is located in a bit index explicit replication (BIER) network, and wherein the BFER comprises:

a processor configured to:

determine, according to information about a multicast group in a multicast receiver list obtained in advance, an Internet Protocol (IP) address of a registration router that supports the multicast group, wherein the registration router is configured to process a multicast registration message;

generate a BFER registration message according to the information about the multicast group and the IP address of the registration router, wherein the BFER registration message is part of the multicast registration message, wherein the BFER registration message comprises the information about the multicast group, wherein a destination IP address of the BFER registration message is the IP address of the registration router, and wherein a source IP address of the BFER registration message is an IP address of the BFER; and obtain a BFER deregistration message after an entry that is part of the multicast receiver list is deleted, wherein the deleted entry comprises information about a multicast group, wherein the BFER deregistration message comprises the information about the multicast group in the deleted entry and the IP address of the BFER, and a transmitter coupled to the processor and configured to:

send the BFER registration message to the registration router; and send the BFER deregistration message to the registration router.

9. The BFER of claim 8, wherein the processor is further configured to:

obtain information about at least one registration router by static configuration, wherein the information about the at least one registration router comprises an IP address of the at least one registration router and information about a multicast group supported by the at least one registration router, wherein the advertisement packet advertises that the at least one registration router is configured to process the multicast registration message, and wherein the advertisement packet comprises the information about the at least one registration router; and determine, according to the information about the multicast group in the multicast receiver list and the information about the multicast group supported by the at least one registration router, the IP address of the registration router that supports the multicast group in the multicast receiver list.

10. A registration router, wherein the registration router is located in a bit index explicit replication (BIER) network, wherein the registration router is configured to process a multicast registration message, and wherein the registration router comprises:

a receiver configured to receive a bit-forwarding egress router (BFER) registration message from a BFER, wherein the multicast registration message comprises the BFER registration message, wherein the BFER registration message comprises information about a multicast group, wherein a destination Internet Protocol (IP) address of the BFER registration message is an IP address of the registration router, and wherein a source IP address of the BFER registration message is an IP address of the BFER;

a processor coupled to the receiver and configured to obtain a BFER entry according to the BFER registration message, wherein the BFER entry comprises the information about the multicast group and the IP address of the BFER, and wherein the IP address of the BFER corresponds to the information about the multicast group; and a transmitter coupled to the receiver and the processor and configured to send an advertisement packet in the BIER network, wherein the advertisement packet advertises that the registration router is configured to process the multicast registration message, and wherein the advertisement packet comprises the IP address of the registration router and the information about the multicast group, wherein the receiver is further configured to receive a BFER deregistration message from the BFER, wherein the BFER deregistration message comprises the IP address of the BFER and information about a deleted multicast group, and wherein the processor is further configured to:

determine a to-be-deleted BFER entry according to the information about the multicast group and the IP address of the BFER, wherein the to-be-deleted BFER entry comprises the IP address of the BFER and the information about the deleted multicast group; and delete the to-be-deleted BFER entry.

11. The registration router of claim 10, wherein the receiver is further configured to receive a multicast packet from a router coupled to a multicast source, wherein the multicast packet comprises the information about the multicast group, wherein the processor is further configured to:

determine the BFER entry according to the information about the multicast group that is part of the multicast packet;

obtain the IP address of the BFER according to the BFER entry; and obtain a BIER multicast packet according to the IP address of the BFER and the multicast packet, wherein the BIER multicast packet comprises a BIER header and the multicast packet, wherein the BIER header comprises a bit string, and wherein a bit, in the bit string, corresponding to the BFER is set, and wherein the transmitter is further configured to send the BIER multicast packet to the BFER.

12. The registration router of claim 10, wherein the processor is further configured to:

obtain, from a router coupled to a multicast source, the information about the multicast group and an IP address of the router coupled to the multicast source;

determine, according to the information about the multicast group, the BFER entry corresponding to the multicast group; and obtain a BFER list message according to the BFER entry corresponding to the multicast group and the IP address of the router coupled to the multicast source, wherein the BFER list message comprises the IP address of the BFER corresponding to the multicast group, and wherein a destination IP address of the BFER list message is the IP address of the router coupled to the multicast source, wherein the transmitter is further configured to send the BFER list message to the router coupled to the multicast source, wherein the receiver is further configured to receive an encapsulated packet sent through a tunnel by the router coupled to the multicast source, wherein the encapsulated packet comprises a packet header and a multicast packet that is from the multicast source to the router coupled to the multicast source, wherein a source IP address of the tunnel in the packet header is the IP address of the router coupled to the multicast source, and wherein the multicast packet comprises the information about the multicast group, and wherein the processor is further configured to:
 obtain, from the multicast packet, the information about the multicast group; and
 obtain, from the packet header, the IP address of the router coupled to the multicast source.

13. The registration router of claim 10, wherein the processor is further configured to:

obtain, from a router coupled to a multicast source, the information about the multicast group and an IP address of the router coupled to the multicast source;

determine, according to the information about the multicast group, the BFER entry corresponding to the multicast group; and obtain a BFER list message according to the BFER entry corresponding to the multicast group and the IP address of the router coupled to the multicast source, wherein the BFER list message comprises the IP address of the BFER corresponding to the multicast group, and wherein a destination IP address of the BFER list message is the IP address of the router coupled to the multicast source, wherein the transmitter is further configured to send the BFER list message to the router coupled to the multicast source, wherein the receiver is further configured to receive a multicast source registration message from the router coupled to the multicast source, wherein the multicast source registration message comprises the information about the multicast group and the IP address of the router coupled to the multicast source, and wherein the processor is further configured to obtain, from the multicast source registration message, the information about the multicast group and the IP address of the router coupled to the multicast source.

14. A bit-forwarding ingress router (BFIR), wherein the BFIR is located in a bit index explicit replication (BIER) network, and wherein the BFIR comprises:

a receiver configured to receive a multicast packet from a multicast source, wherein the multicast packet comprises information about a multicast group, and wherein the BFIR is coupled to the multicast source;

a processor coupled to the receiver and configured to:
 obtain, from a registration router, an Internet Protocol (IP) address of a bit-forwarding egress router (BFER) corresponding to the multicast group, wherein the registration router is configured to process a multicast registration message;
 obtain a BIER multicast packet according to the multicast packet and the IP address of the BFER, wherein the BIER multicast packet comprises a BIER header and the multicast packet, wherein the BIER header comprises a bit string, and wherein a bit, in the bit string, corresponding to the BFER is set; and
 obtain information about at least one registration router by receiving an advertisement packet, wherein the advertisement packet advertises that the at least one registration router is configured to process the multicast registration message, wherein the advertisement packet comprises the information about the at least one registration router, and wherein the information about the at least one registration router comprises an IP address of the at least one registration router and information about a multicast group supported by the at least one registration router; and a transmitter coupled to the receiver and the processor and configured to:
 send the BIER multicast packet to the BFER; and
 send a multicast source registration message to the registration router according to an IP address of the registration router, wherein the multicast source registration message comprises the information about the multicast group and an IP address of the BFIR, and wherein the multicast registration message comprises the multicast source registration message, wherein receiver is further configured to receive a BFER list message from the registration router, wherein the BFER list message comprises the IP address of the BFER, wherein a destination IP address of the BFER list message is the IP address of the BFIR, and wherein a source IP address of the BFER list message is the IP address of the registration router, and wherein the processor is further configured to obtain the IP address of the BFER from the BFER list message.

* * * * *